(12) United States Patent
Athan

(10) Patent No.: US 7,992,353 B2
(45) Date of Patent: Aug. 9, 2011

(54) SPACE FRAME HUB JOINT

(76) Inventor: Stephan P. Athan, Tampa, FL (US)

( * ) Notice: Subject to any disclaimer, the term of this patent is extended or adjusted under 35 U.S.C. 154(b) by 184 days.

(21) Appl. No.: 12/331,777

(22) Filed: Dec. 10, 2008

(65) Prior Publication Data
US 2010/0139202 A1 Jun. 10, 2010

(51) Int. Cl.
E04B 7/08 (2006.01)

(52) U.S. Cl. .............. 52/81.3; 52/81.2; 52/637; 52/646; 52/653.2; 403/116

(58) Field of Classification Search .............. 52/655.1, 52/36.6, 81.2, 81.3, 637, 646, 653.2, 659; 403/113, 116
See application file for complete search history.

(56) References Cited

U.S. PATENT DOCUMENTS

| | | |
|---|---|---|
| 2,986,241 A | 5/1961 | Fuller |
| 3,220,152 A | 11/1965 | Sturm |
| 3,323,820 A | 6/1967 | Braccini |
| 3,354,591 A | 11/1967 | Fuller |
| 3,766,932 A | 10/1973 | Sidis et al. |
| 3,830,031 A | 8/1974 | Soisson |
| 3,857,212 A | 12/1974 | Barnett |
| 3,914,063 A | 10/1975 | Papayoti |
| 4,027,449 A | 6/1977 | Alcalde Cilveti |
| 4,039,263 A | 8/1977 | Bassler |
| 4,122,646 A | 10/1978 | Sapp |
| 4,247,218 A | 1/1981 | Jeannin |
| 4,262,461 A * | 4/1981 | Johnson et al. ............ 52/81.3 |
| 4,296,585 A * | 10/1981 | Bini ............ 52/745.08 |
| 4,332,501 A | 6/1982 | Slysh |
| 4,355,918 A | 10/1982 | Van Vliet |
| 4,464,073 A | 8/1984 | Cherry |
| 4,480,418 A | 11/1984 | Ventrella |
| 4,521,998 A | 6/1985 | DeLorme |
| 4,558,713 A | 12/1985 | Hagler et al. |
| 4,627,210 A | 12/1986 | Beaulieu |
| 4,671,693 A * | 6/1987 | Rossman ............ 403/174 |
| 4,676,043 A | 6/1987 | Grimm |
| 4,704,836 A | 11/1987 | Codd |
| 4,903,452 A | 2/1990 | Huang |
| 4,932,808 A | 6/1990 | Bar et al. |
| 4,974,986 A | 12/1990 | Cook |
| 5,056,291 A | 10/1991 | Leung |
| 5,069,572 A | 12/1991 | Niksic |
| 5,127,759 A | 7/1992 | Orbom |
| 5,163,262 A | 11/1992 | Adams |
| 5,165,214 A | 11/1992 | Codd |
| 5,291,708 A | 3/1994 | Johnson |
| 5,356,234 A | 10/1994 | Vangool |
| 5,393,163 A | 2/1995 | Wolf |

(Continued)

OTHER PUBLICATIONS

S. Stephan, J. Sanchez-Alvarz, K. Knebel, Reticulated Structures on Free-Form Surfaces.

(Continued)

Primary Examiner — Eileen Lillis
Assistant Examiner — Branon C Painter
(74) Attorney, Agent, or Firm — RatnerPrestia

(57) ABSTRACT

A hub joint includes a metal rod and pin for joining tubular members in three-dimensional space for assembling a frame structure. The hub joint enables rapid assembly, rapid reconfiguration, and rapid disassembly without using any specialized tools. Multiple hub joints may be used to form geodesic domes, freestanding trusses, space frame slabs, tetrahedrons, and pentahedrons. The hub joints allow different frame configurations that are lightweight, strong, durable, scalable, expandable, and portable.

17 Claims, 22 Drawing Sheets

U.S. PATENT DOCUMENTS

| | | | |
|---|---|---|---|
| 5,546,722 A * | 8/1996 | Huang | 52/646 |
| 5,556,219 A | 9/1996 | Mason | |
| 5,626,434 A | 5/1997 | Cook | |
| 5,661,942 A | 9/1997 | Palmer | |
| 5,667,326 A | 9/1997 | McGaffigan | |
| 5,704,185 A | 1/1998 | Lindsay | |
| 5,797,695 A | 8/1998 | Prusmack | |
| 5,845,451 A * | 12/1998 | Tolentino | 52/646 |
| 5,956,917 A | 9/1999 | Reynolds | |
| 5,996,288 A * | 12/1999 | Aiken | 52/81.3 |
| 6,032,430 A | 3/2000 | Soukup | |
| 6,062,340 A * | 5/2000 | Walker | 182/5 |
| 6,273,633 B1 | 8/2001 | Husson et al. | |
| 6,475,117 B1 | 11/2002 | Berglund et al. | |
| 6,622,447 B1 | 9/2003 | Kessler | |
| 6,672,789 B2 | 1/2004 | Chen | |
| 6,675,546 B2 * | 1/2004 | Coles | 52/655.1 |
| 6,679,644 B1 * | 1/2004 | Heller | 403/220 |
| 6,840,698 B2 | 1/2005 | Cattaneo | |
| 6,840,699 B2 | 1/2005 | Rogers et al. | |
| 6,857,246 B2 * | 2/2005 | Erbetta et al. | 52/653.2 |
| 6,869,246 B2 | 3/2005 | Bridgers | |
| 6,887,009 B1 | 5/2005 | Lopez | |
| 7,059,094 B2 * | 6/2006 | Yamawaki | 52/646 |
| 7,231,745 B1 | 6/2007 | Shoji | |
| 7,533,681 B2 * | 5/2009 | Miller | 135/130 |
| 2003/0101677 A1 * | 6/2003 | Hewett | 52/655.1 |

OTHER PUBLICATIONS

Historic American Engineering Record, "Trusses a Study by the Historic American Engineering Record, Technical Information Project, Truss Identification: Nomenclature and Truss Identification: Bridge Types".

Professor F. Eng, "Development of Jointing Systems for Modular Prefabricated Steel Space Structures", Lightweight Structures in Civil Engineering, Proceedings of the International Symposium, General Lectures, Warsaw, Poland, Jun. 24-28, 2002.

M. Kawaguchi and M. Abe, "On Some Characteristics of Pantadome System", Lightweight Structures in Civil Engineering, Proceedings of the International Symposium, General Lectures, Warsaw, Poland, Jun. 24-28, 2002.

S. J. Medwadowski, "Alvar Aalto's Benedictine Library", Lightweight Structures in Civil Engineering, Proceedings of the International Symposium, General Lectures, Warsaw, Poland, Jun. 24-28, 2002.

* cited by examiner

SPACE FRAME HUB JOINT

BACKGROUND OF THE INVENTION

Hub joints used for joining space frames typically include multiple assembly parts, and require significant time to assemble or disassemble using special tools. Conventional hub joints may only be assembled into a specific structure. The cost of conventional hub joints is typically high, due to components requiring machining or custom fabrication.

Space frames have increased in popularity in the last decades. This is due to better materials and computer aided design tools. Indeed, complex space frame and truss structures may be seen in many applications including amusement parks, commercial buildings, complexes, hangers, space stations, playgrounds, road signs, towers, and tents, for example.

A key component of any space frame structure is the connector or joint. The type of joint depends on the connection method (welding, bolting, etc.), the size of the joining members, and the role the space frame has in the application. Many types of joints are used for space frame structures. For example, Leung in U.S. Pat. No. 5,056,291 describes a modular system for space frame structures, in which a crystal-like hub is used to connect struts in a variety of configurations. The hub joins struts having ends equipped with C-shaped grips, which engage trunnions. The C-shaped end grips may rotate about an axis of the trunnions. A disadvantage of the Leung invention is that it requires custom manufactured components and special tooling. The Leung invention is also limited in the number of struts that may be attached to the hub. Furthermore, although the end grips snap into place, they are not locked and, hence, may unexpectedly be unsnapped.

Grimm in U.S. Pat. No. 4,676,043 describes a hub joint having elements arranged concentrically to one another. The Grimm invention forms a strong, complex, durable space frame structure. However, the Grimm invention requires custom manufactured components and special tooling, including multiple bolts and pins that have high non-recurring setup and manufacturing costs.

Some popular conventional joints include: (1) the MERO connector, (2) the UNISTRUT system, (3) the Space Deck system, (4) the Triodetic system, (5) the UNIBAT system, and (6) the NODUS system The MERO connector, introduced in 1942, includes tubular members with threaded ends connected to a steel sphere node. The sphere node is drilled and tapped to accept the tubular members. The MERO connector is a popular connector due to its strength, elegance of assembly, and improvements including a cylindrical joint (type ZK), a plate-disc joint (type TK), a hollow semi-spherical joint (type NK), and a block joint (type BK).

The UNISTRUT system, introduced in 1955, includes a connector consisting of a pressed steel plate formed in a special tooling machine. The UNISTRUT system, which includes four components, is self aligning and self-leveling.

The Space Deck system was introduced in the United Kingdom during the 1960s as an industrialized space frame system which, when assembled at the site, produces a double-layer square-on-offset square configuration. The basic unit is an inverted square based pyramid consisting of an angle top tray and four diagonal or bracing members. Connection requires bolting top layer members and interconnecting them using tie bars. A turnbuckle is used to adjust the center camber of the structure.

A Canadian firm of F. Fentiman developed the Triodetic system, which is a popular hub joint system. This system uses an extruded aluminum hub for inserting members of any cross-section, after a deforming process to shape the ends of the members. This hub joint system effectively substitutes for welding, bolting or riveting.

S. du Chateau introduced the UNIBAT system in France in 1977. Its modular pyramidal skeletal units are bolted at their corners to adjacent units with bolts. A lower layer is formed by tubular members, which are flattened and joined by only one vertical bolt. The UNIBAT system may be used for double-layered or multi-layered structures.

The Tubes Division of the British Steel Corporation introduced the NODUS system in 1972. The joint of the NODUS system consists of two casings, with chord and fork connectors used as diagonals. The casings are held together by a center bolt. Although the NODUS system has been used in the construction of horizontal double-layer grids, it may be adapted to vertical, inclined or multi-layer grids. This system has been used throughout the world.

Common to all of the above mentioned hub joints are multiple components requiring custom manufacturing, complex assembly, and/or specialized tools. Hence, the cost of manufacturing, assembling, reconfiguring, and disassembling the aforementioned systems is high, when used in large or complex structures. Furthermore, they may only be used in specific structures for which they were originally intended. Joints and members cannot be removed after a structure is partially or fully assembled.

As will be explained, the present invention provides a simple, low cost, lightweight, strong, and durable hub joint for rapidly assembling, reconfiguring, or disassembling a frame structure. The present invention joins and secures tubular members at a vertex or a node using a low cost hub joint that requires minimal manufacturing costs with common off the shelf materials and components.

As will be explained, the present invention includes a hub joint that may be easily scaled using any size and number of tubular members, and may be used in any type of space frame structure including geodesic domes, trusses, slabs, 4-sided pyramids, 5-sided pyramids, and circular structures.

SUMMARY OF THE INVENTION

To meet this and other needs, and in view of its purposes, the present invention provides a joint for attaching a plurality of longitudinal members. The joint includes:

(a) at least two members, each including a circumferential wall forming a longitudinal core, (b) a transverse slot formed through the circumferential wall for communication with the longitudinal core of each member, (c) a rod for insertion into the transverse slots of the at least two members, and (d) a respective locking pin for insertion into the longitudinal core of a respective member for clasping the rod. The rod is inserted through the transverse slot of the at least two members, and the respective locking pin clasps the rod.

The rod is curved and ends of the rod are in contact to form a ring. The locking pin includes two arms biased by a spring, and the two arms are configured to clasp the rod. The members are rotatable about the rod. The rod is inserted substantially parallel to the transverse slot of each member. The locking pin is inserted substantially parallel to the longitudinal core of each member. The rod forms a hinge, about which each member is rotatable.

The transverse slot is formed at a first longitudinal end of each member, and the rod is transversely inserted into the slot at the first longitudinal end of each member. At least one member includes an additional transverse slot formed at a second longitudinal end of the one member. An additional rod and an additional locking pin are configured for insertion into the second longitudinal end of the one member and the additional transverse slot, respectively. A cap is provided for sealing an end of the longitudinal core of the respective member, after the locking pin is inserted to clasp the rod. The rod is shaped to form a polygon with the ends of the rod abutted to each other.

Another embodiment of the present invention is at least one joint for attaching longitudinal members. The joint includes:

(a) a rod curved to form a ring or a polygon, (b) a longitudinal bore extending between first and second end portions of each longitudinal member, (c) a slot formed transversely at the first end portion of each longitudinal member, wherein the transverse slot is in communication with the longitudinal bore, and (d) a clasp provided for each transverse slot.

The transverse slot of each member is configured to receive a section of the rod for orienting the first end portions of the longitudinal members adjacent to each other, and the second end portions of the longitudinal members extending radially away from the rod. The clasp is configured for insertion into the longitudinal bore to lock the rod within the transverse slot. The clasp includes two arms biased by a spring, and the two arms extend into the longitudinal bore and through the transverse slot to envelop the rod and form a hinge about which the longitudinal members are rotatable.

The at least one joint may further include:

(e) another transverse slot formed at the second end portion of one of the longitudinal members, (f) another rod, and (g) another clasp.

The other rod is inserted in the other transverse slot formed at the second end portion of the one longitudinal member. The other clasp is configured for insertion into the longitudinal bore to lock the other rod within the other transverse slot.

The at least one joint may further include:

(h) still another transverse slot formed at the second end portion of another one of the longitudinal members, (i) still another rod, and (j) still another clasp.

The still other rod is inserted in the still other transverse slot formed at the second end portion of the other one longitudinal member. The still other clasp is configured for insertion into the longitudinal bore to lock the still other rod within the still other transverse slot.

The at least one joint may further include: a plurality of transverse slots formed in a plurality of longitudinal members wherein two of the slots are formed in each of the plurality of longitudinal members; a plurality of rods; and a plurality of clasps. The plurality of longitudinal members, the plurality of rods and the plurality of clasps are configured to form a space frame structure.

The longitudinal members are rotatable about a hinge formed by the rod inserted in the transverse slots of the longitudinal members. The longitudinal members are formed from either hollow PVC tubing, hollow steel tubing, or hollow aluminum tubing.

Yet another embodiment of the present invention is a method of forming a space frame structure. The method includes the steps of:

(a) forming a transverse slot at each end portion of a circumferential wall of each of a plurality of longitudinal members;

(b) inserting a first circular or polygonal rod into a first set of multiple transverse slots to form a first joint;

(c) clasping the first set in the first rod to form a first hinge for rotating the longitudinal members about the first hinge;

(d) inserting a second circular or polygonal rod into a second set of multiple transverse slots to form a second joint; and (e) clasping the second set in the second rod to form a second hinge for rotating the longitudinal members about the second hinge.

The first and the second joints are configured to form a portion of a three-dimensional frame structure. The first and second hinges are oriented at different points in the three-dimensional frame structure.

The method may further include the step of covering the longitudinal members with a skirt.

The step of clasping may be performed by hand. The method may include the step of separating the first and second hinges from the longitudinal members by hand.

BRIEF DESCRIPTION OF THE FIGURES

The invention may be understood from the following detailed description when read in connection with the accompanying figures.

DETAILED DESCRIPTION OF THE INVENTION

Figure 1:
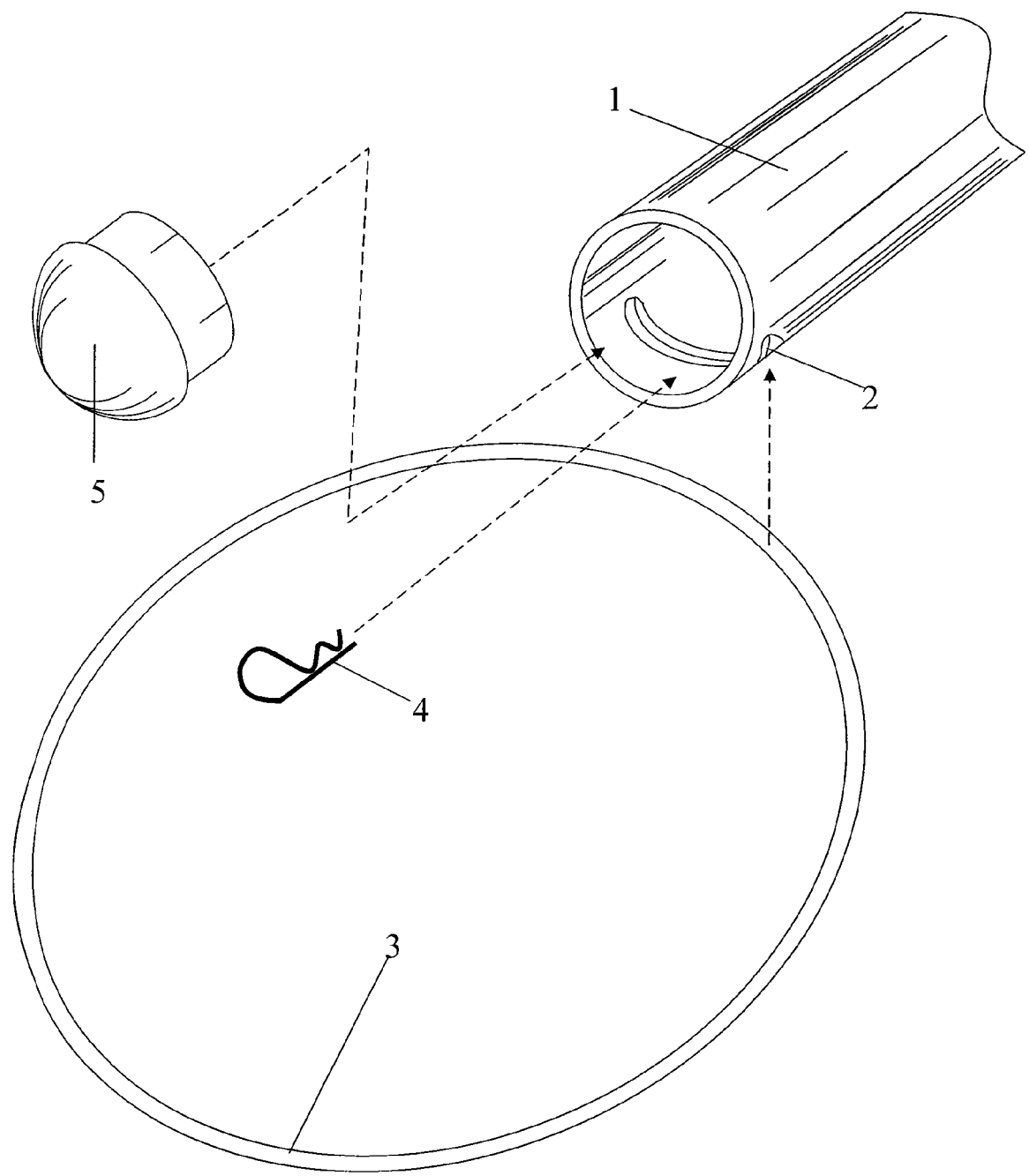
FIG. 1 shows a notched tubular member, a ring, a locking pin, and an end cap, in accordance with an embodiment of the invention.

FIG. 1 shows a longitudinal tubular member 1, with a transverse slot or notch 2, cut through a circumferential wall of the member, which is adjacent to the end of the member. The figure also shows ring 3, pin 4, and end cap 5. The components in FIG. 1 are assembled by inserting ring 3 into slot 2. The pin 4 is then inserted through the open end of the tubular member for enveloping the ring segment inserted through notch 2. The pin 4 thus prevents the ring from falling out of the notch. End cap 5 is fitted into the end of the tubular member, after the pin is inserted. This provides a covering for the open end of the member. The end cap 5 is shown inserted into the tube end; however, an outside end cap may be used with a slightly larger end cap and ring diameter.

The notch 2 may be formed at one end or both ends of the tubular member, for example, one half inch from each end. The tubular member 1 is free to pivot almost 360 degrees about its ring segment while still retaining its integrity and strength. This freedom of motion is a key advantage to the flexibility and diverse construction forms that may be formed with the invention.

The length of notch 2 may be cut through no more than one third the circumference of the tube, for example, so that pin 4 may fit easily about the exposed ring segment in the slot or notch 2. The width of notch 2 may be the same as the thickness of the ring, for example, $5/32"$, $3/16"$, etc. The notch may be cut, for example, parallel to the end of the member or parallel to the ring radius providing any ring diameter. Inserting and removing pin 4 may be performed by hand as it requires neither tools, nor special equipment.

The diameter of ring 3 may be considered to be a function of the outer diameter of the tubular member, the distance of notch 2 from the end of the tubular member, and the number of tubular members connected to the ring. For example, for 1.5" schedule 40 PVC, the PVC tubular outer diameter is 1.9", or approximately 2". If twelve 1.5" PVC tubes converge at the same ring, then the ring circumference is at least equal to $12 \times 2"=24"$. The circumference, c, of a circle is equal to the diameter d times $\pi$. Therefore, the diameter is at least c divided by $\pi$ or 7.6". If notch 2 is cut $1/2"$ from the end of the tube, then twice that distance may be added ($2 \times 1/2"=1"$), to 7.6" or 7.6"+1"=8.6". Therefore, the diameter of ring 3 may be at least 8.6" for receiving twelve 1.5" schedule 40 PVC tubular members.

The tubular member 1 and end cap 5 may be fabricated, for example, from polyvinylchloride (PVC), aluminum, or steel to prevent bending or breaking under heavy loads. Furniture grade PVC is available in many sizes and colors and may be fabricated with an ultraviolet (UV) inhibitor for outdoor use. The ring may be fabricated, for example, from $5/32"$ or $3/16"$ 1080 steel or 304 stainless steel rod stock and may be butt-welded at the joined ends of the ring. The pin may be, for example, a hitch pin or bow tie cotter pin, and may be made of steel or stainless steel, so that it easily locks around or envelops the ring and does not break, shear, or separate from the ring. The pin fits easily inside the end of the member and locks about the ring and may easily be removed by hand, if necessary.

The present invention provides a joint that is as strong as or stronger than the tubular members, while still allowing quick assembly, reconfiguration, and disassembly of any space frame structure, without use of tools or specialized equipment. The present invention allows tubular members to be quickly assembled with only two components: ring 3 and pin 4. The present invention also allows tubular members to be easily added or removed from a structure that has already been assembled. This is possible without distorting adjacent members or requiring any special tools or equipment. The tubular members may easily be slid into or out of place, once the locking pin is removed. This is true for all tubular members in any orientation in the structure. An assembled structure may easily be expanded in size, by simply inserting additional tubular members with locking pins and end caps.

Typical schedule 40 PVC diameter dimensions for the tubular members are:

| PVC Size | O.D. | I.D. |
| --- | --- | --- |
| 1" | 1.215" | 1.029" |
| 1.25" | 1.66" | 1.36" |
| 1.5" | 1.9" | 1.59" |
| 2" | 2.375" | 2.047" |

While typical schedule 80 PVC dimensions for the tubular members may be:

| PVC Size | O.D. | I.D. |
| --- | --- | --- |
| 1" | 1.315" | 0.936" |
| 1.25" | 1.66" | 1.255" |
| 1.5" | 1.476" | 1.476" |
| 2" | 2.375" | 1.913" |

Figure 2:
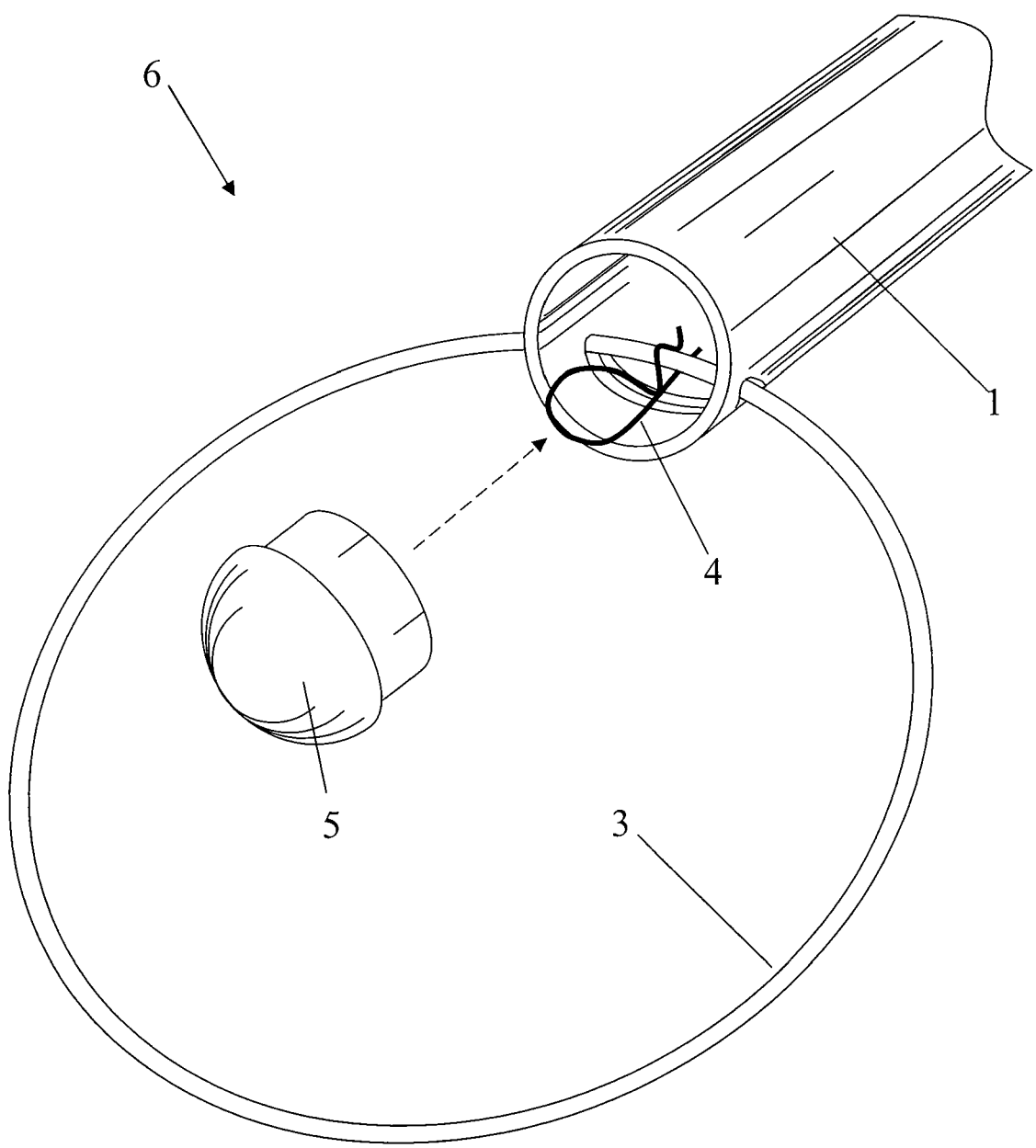
FIG. 2 is an assembled notched tubular member, ring, and locking pin with an end cap, in accordance with an embodiment of the invention.

FIG. 2 shows an embodiment of the present invention in assembled form at one end of tubular member 1. Of course, both ends of tubular member 1 may be similarly notched. As shown, ring 3 fits easily into notch 2 and pin 4 may be inserted by hand through the core of the tubular member (also referred to herein as the tube) at one end and locked about the exposed ring segment inside the tube. End cap 5 may be inserted into the end of the tube after pin 4 is placed on the ring segment. The tube 1 is free to pivot almost 360 degrees about the ring segment, while maintaining the strength and integrity of the joint.

Figure 3:
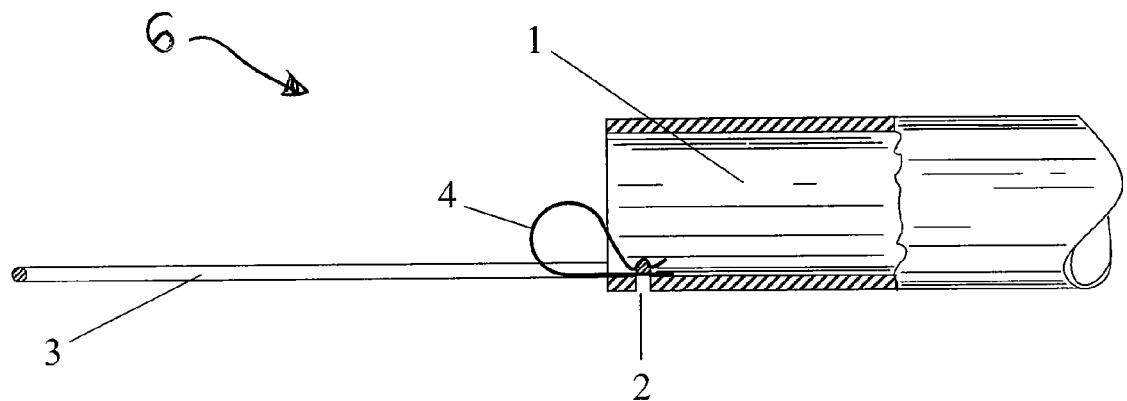
FIG. 3 is a cross section of an assembled notched member, ring, and locking pin, in accordance with an embodiment of the invention.

FIG. 3 shows a cross section of an embodiment of the present invention including ring 3, tube 1 and pin 4. Notch 2 may be cut a minimum of ½" from the end of the tube and its depth may extend to no more than approximately ⅓ of the outer circumference of the tube. The width of the notch may be equal to the thickness of the ring. The straight portion of the pin section, shown parallel to the length of the tubular member, fits between a segment of ring 1 and the inner surface of the tube. The straight portion of the pin may be visible from the opening of notch 2. Both tube ends may be assembled in the same manner using a ring and a pin combination.

Figure 4:
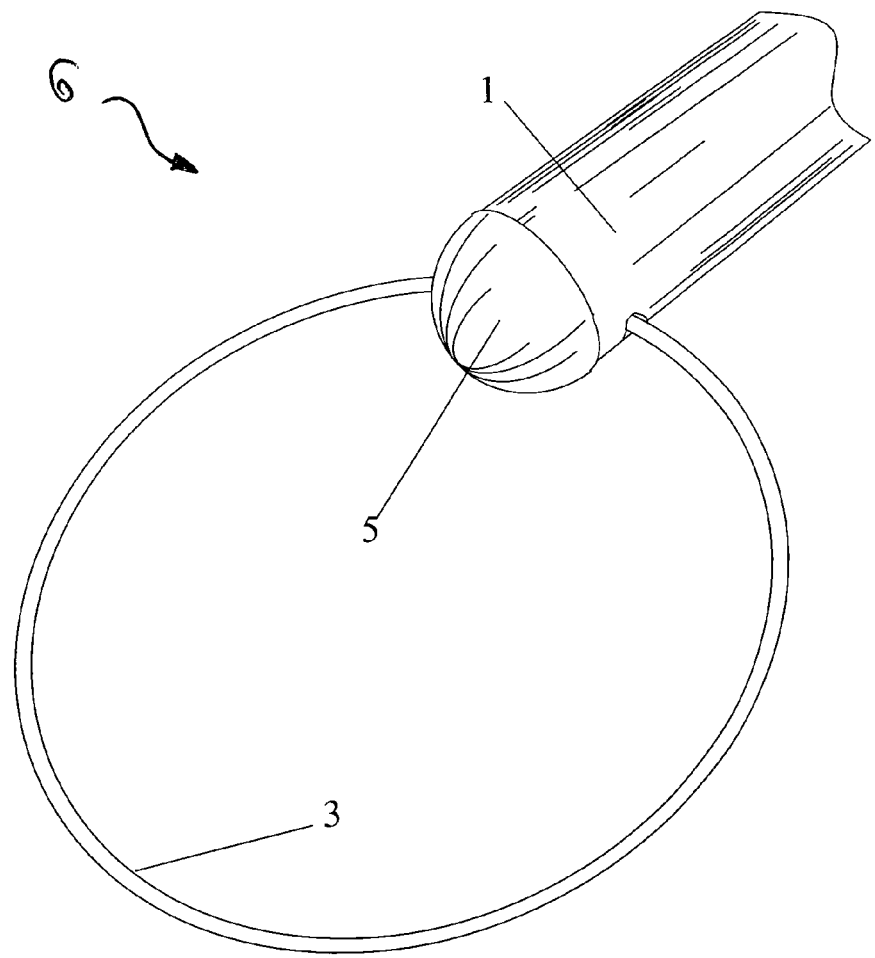
FIG. 4 is an assembled member, ring, pin, and end cap, in accordance with an embodiment of the invention.

FIG. 4 shows an assembled embodiment of the present invention, including tube 1, ring 3 and end cap 5. Although not shown, both ends of tube 1 may include a notch and may be similarly assembled. The combination of tube 1, ring 3 and end cap 5 should include compatible materials that provide sufficient strength and durability for the intended structure. The end cap prevents tampering with the pin and provides an aesthetically pleasing appearance. As such, it may not be necessary and may be considered as optional.

Figure 5:
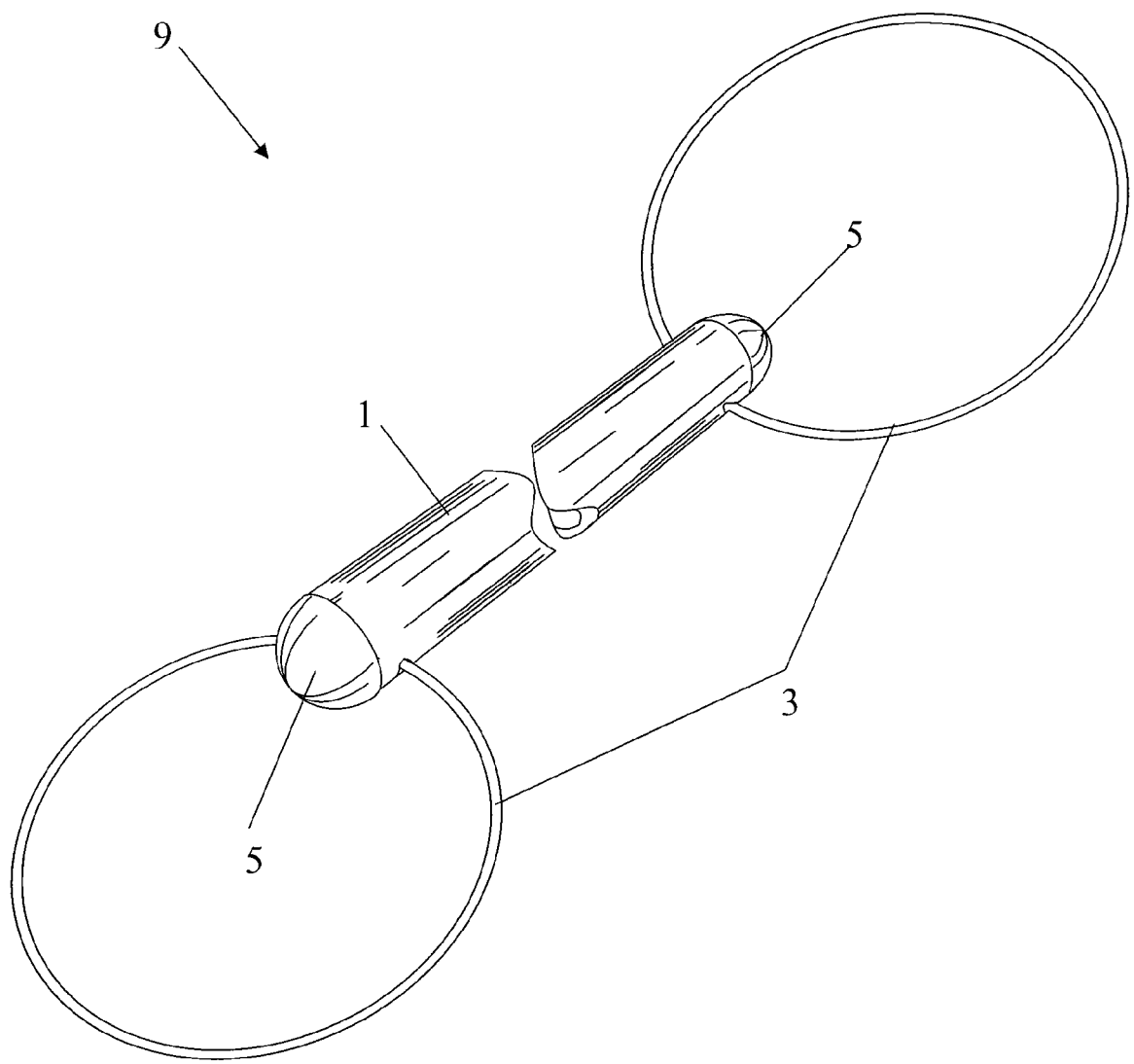
FIG. 5 is an assembled member having a notch at each end, with each end including a ring, a pin, and end cap, in accordance with an embodiment of the invention.

FIG. 5 shows an assembly of an embodiment of the present invention, designated as 9. It includes tubular member 1, ring 3 at each end of the tubular member, and end caps 5, one for each end. The assembly order is not critical, since tubular members may be easily added or removed, even after a structure is fully assembled. The assembly 9 is lightweight, since each component is lightweight, yet provides high strength and durability.

Figure 6:
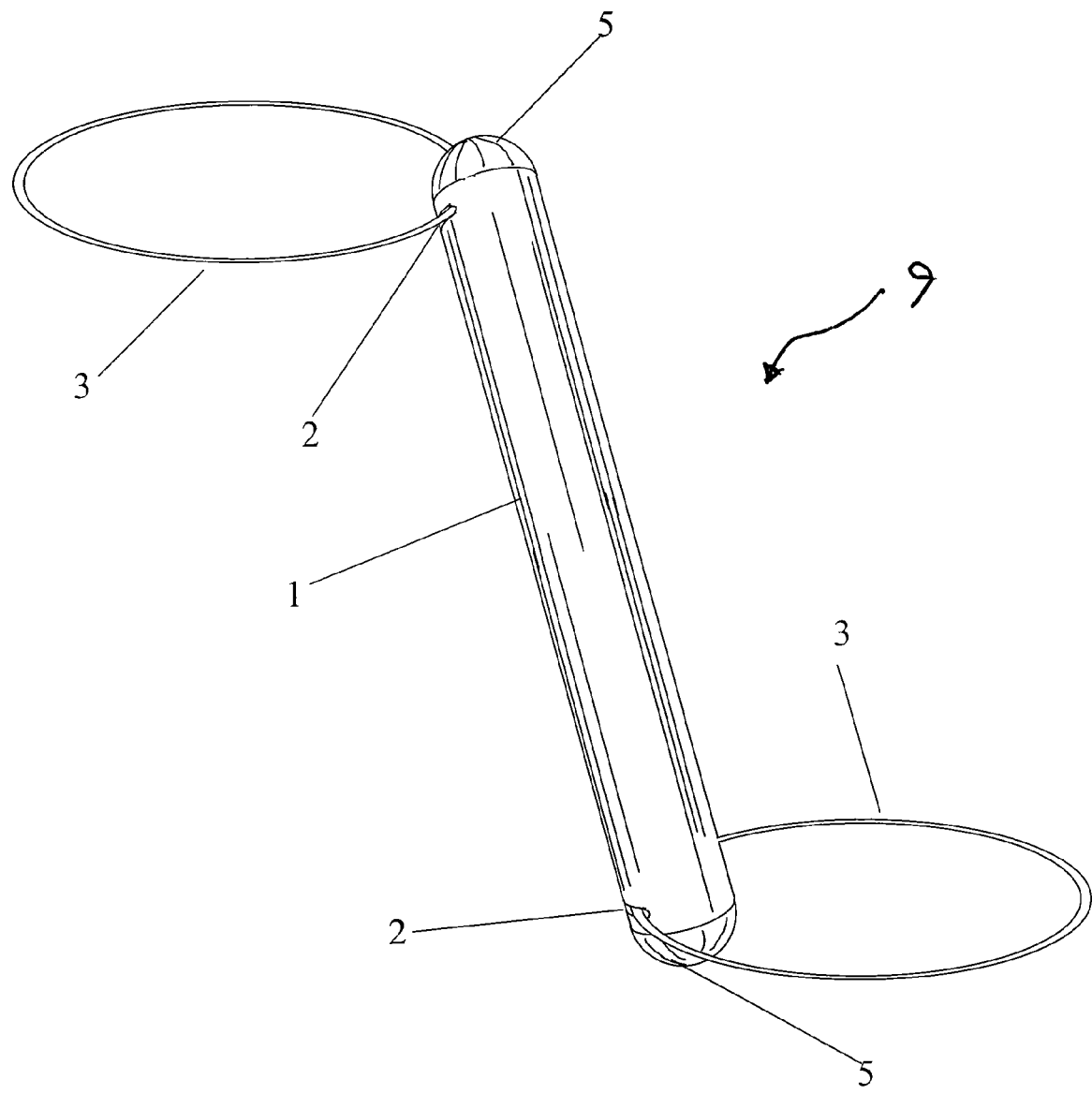
FIG. 6 is another view of the tubular member shown in FIG. 5.

FIG. 6 shows an assembled tube 1, rings 3, and end caps 5 in accordance with the present invention. The pins are not visible in the figure with the end caps in place. The rings 3 in the figure are shown perpendicular to tubular member 1 and may be rotated about ring 3 to almost any angle with respect to tubular member 1. The freedom of rotation of tubular member 1 relative to a plane of ring 3 advantageously allows many different structures to be assembled, reconfigured, and disassembled, while providing a strong, durable, and aesthetically attractive joint.

Figure 7:
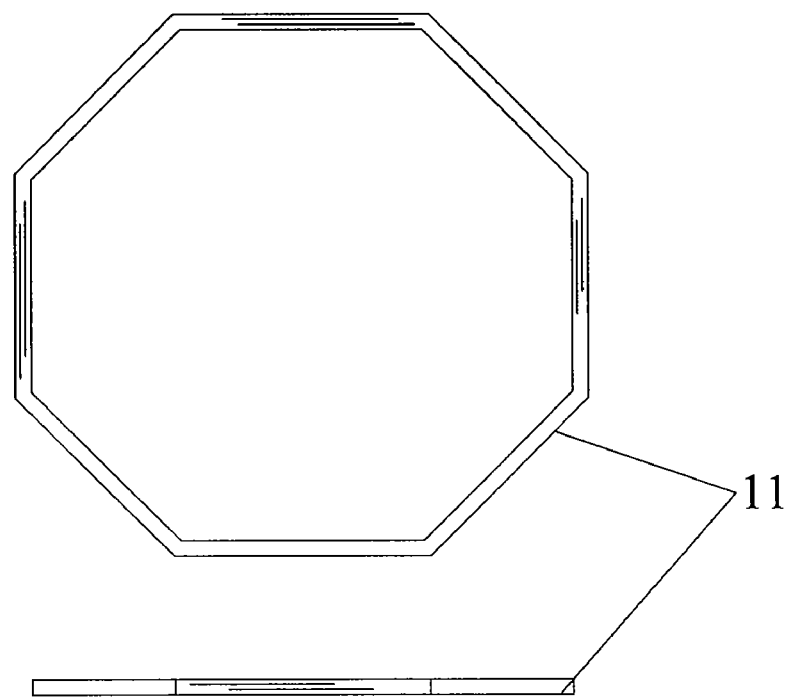
FIG. 7 is an eight-sided ring, in accordance with an embodiment of the invention.

FIG. 7 shows another embodiment of the present invention, in which the ring is not circular in shape, but is polygonal in shape. The eight-sided ring 11 will support up to eight tubular members with individual pins and end caps. The diameter of the eight-sided ring 11 is dependent upon the outer diameters of the attached tubular members. The ring 11 may be fabricated, for example, from steel or stainless steel. The thickness of the ring may be, for example, 5/32" or 3/16. The ring may be lightweight and provide significant strength.

Figure 8:
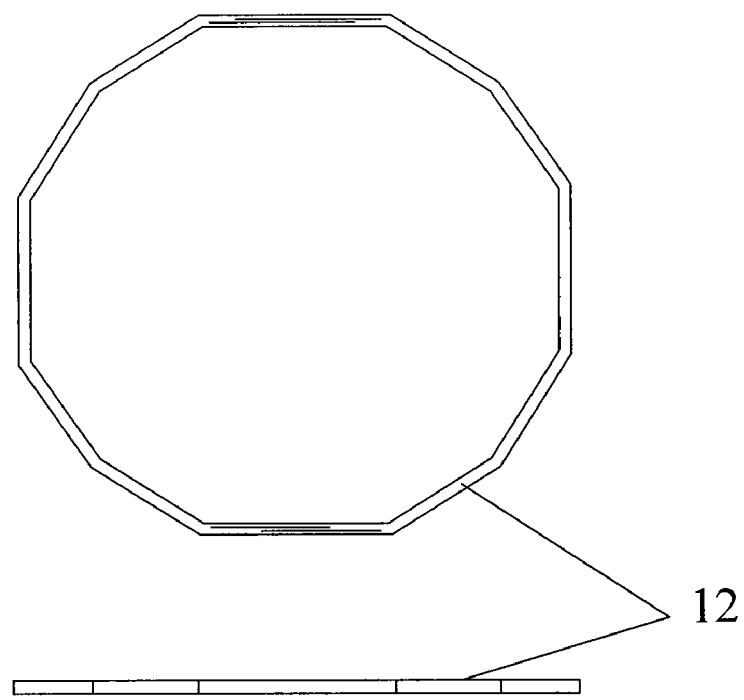
FIG. 8 is a twelve-sided ring, in accordance with an embodiment of the invention.

FIG. 8 shows yet another embodiment of the present invention using a twelve-sided ring 12. The twelve-sided ring 12 will support up to twelve tubular members with respective pins and end caps. The diameter and thickness of the twelve-sided ring 12 may be similar to the eight-sided ring.

Figure 9:
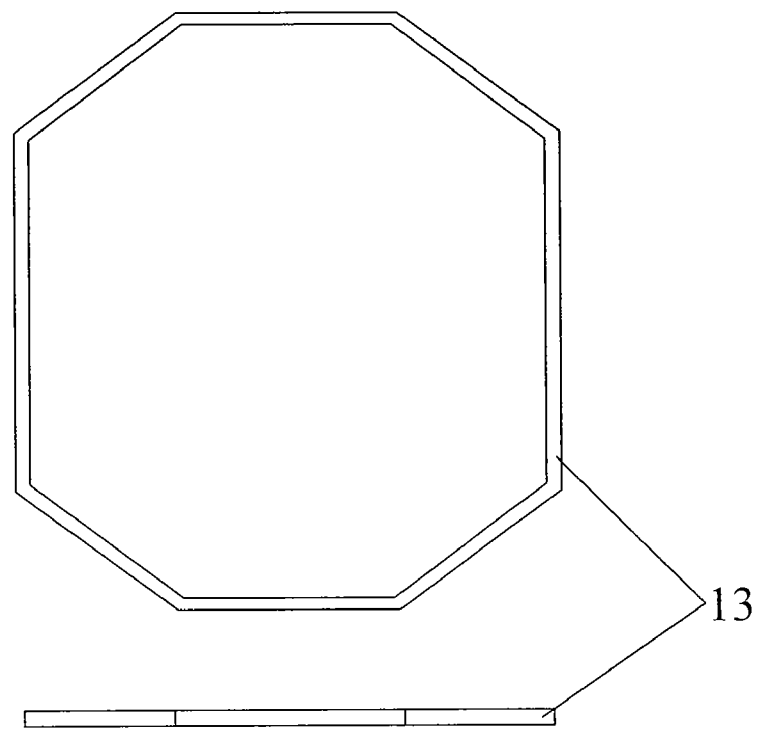
FIG. 9 is an elongated eight-sided ring, in accordance with an embodiment of the invention.
Figure 10:
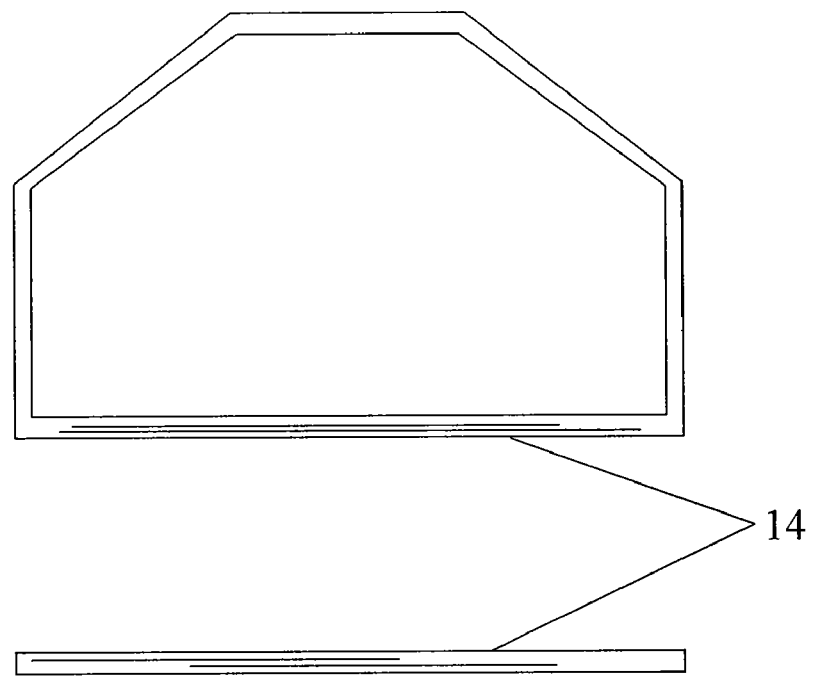
FIG. 10 is a truncated six-sided ring, in accordance with an embodiment of the invention.

FIGS. 9 and 10 show still other embodiments of the present invention. FIG. 9 shows an eight-sided elongated ring, designated as 13, which will support up to ten tubular members with respective pins and end caps. The diameter of the eight-sided ring 13 is dependent upon the outer diameter of attached tubular members, as describe earlier. FIG. 10 shows a six-sided ring, designated as 14, which will support up to seven tubular members with respective pins and end caps. This embodiment may be used, for example, at the outer periphery, or border of a space frame, such as a geodesic dome or a truss, because the ring orientation may be vertical with respect to the ground and two horizontally oriented tubular members may be attached to the longer segment of the six-sided ring 14.

Figure 11:
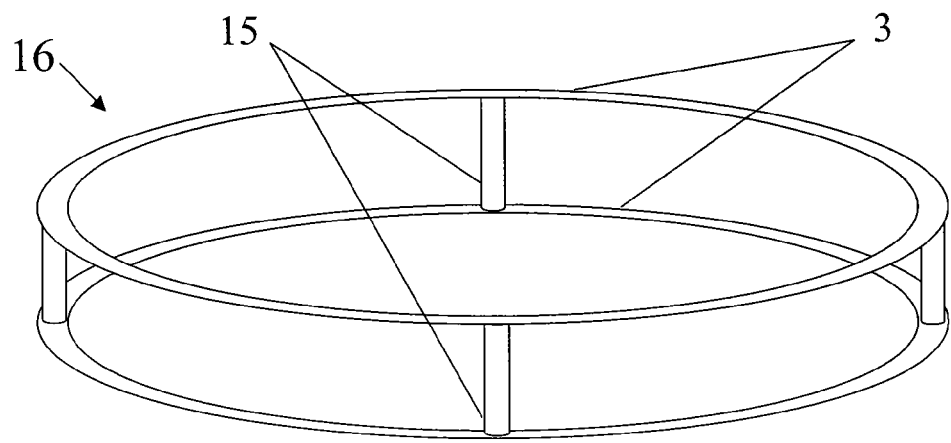
FIG. 11 is a dual ring having four spacers, in accordance with an embodiment of the invention.

FIG. 11 shows another embodiment of the present invention, designated as 16. As shown, two rings 3 are fabricated parallel to one another with the addition of four perpendicular spacers 15 joining the two rings 3. The distance between the parallel rings 3 may be, for example, ½" to 1" depending on the tube size. This embodiment may be used for providing four sections for joining tubular members. The assembly 16, for example, may be used for tubular members having one size for attachment to the lower ring 3 and another size for attachment to the upper ring 3. This embodiment may be used, for example, when multiple tubular members are positioned in the same plane, but need to be perpendicular to the ring plane. This ring structure 16 provides additional stability in complex space frame structures. The spacers 15 provide both positioning indices, as well as structural support.

Figure 12:
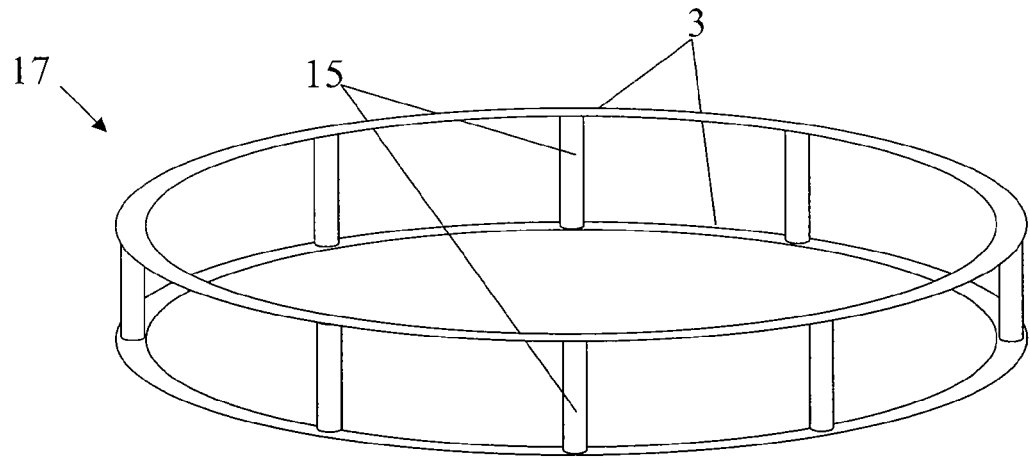
FIG. 12 is a dual ring having eight spacers, in accordance with an embodiment of the invention.
Figure 13:
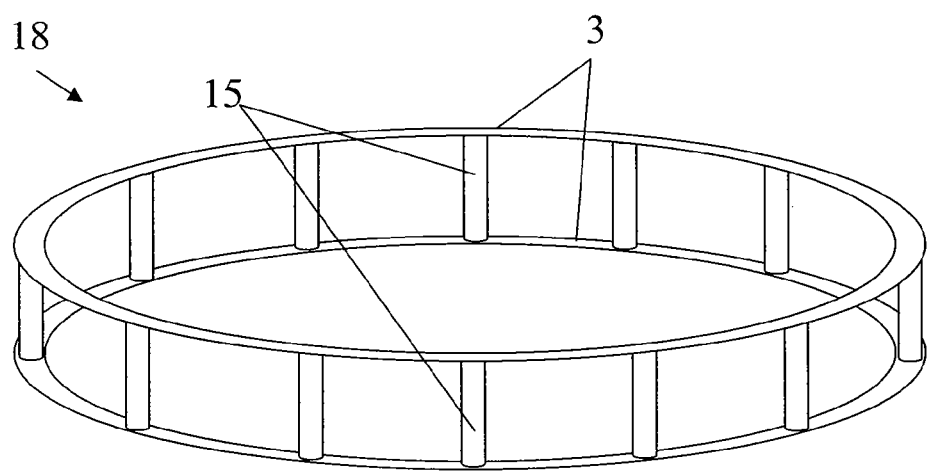
FIG. 13 is a dual ring having twelve spacers, in accordance with an embodiment of the invention.

FIGS. 12 and 13 show two more embodiments of ring structures, designated as 17 and 18, respectively. As shown in FIG. 12, two rings 3 are fabricated parallel to one another with the addition of eight spacers 15 providing eight sections for tube placements. The ring structure may support, for example, eight tubes depending on the ratio of the outer tube diameter and ring diameter. FIG. 13 shows two rings 3 fabricated parallel to one another with the addition of twelve spacers 15 providing twelve sections for tube placements. The ring structure 18 may support, for example, twelve tubes depending on the ratio of the outer tube diameter and ring diameter.

Figure 14:
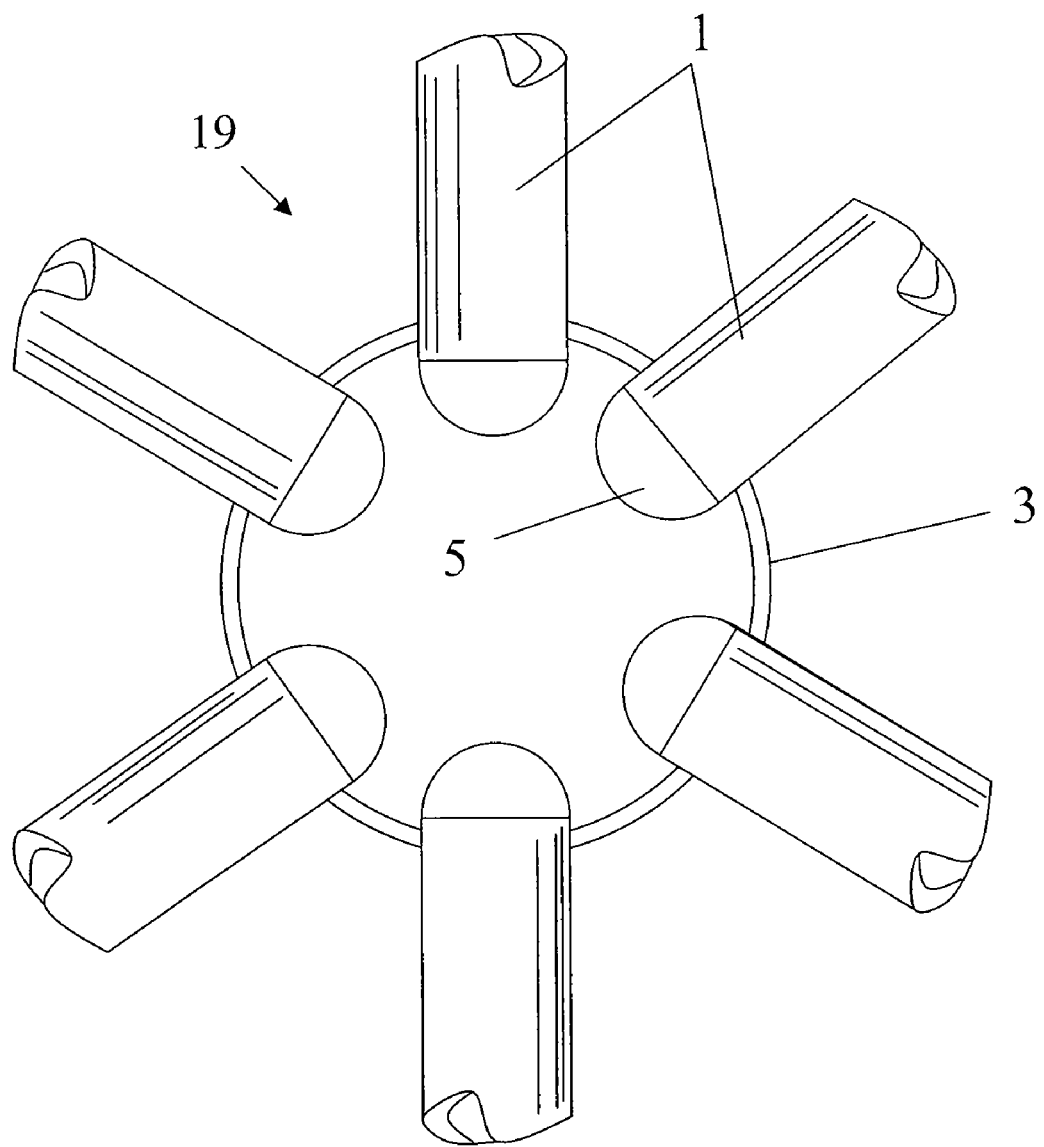
FIG. 14 is a top view of a six-tube ring assembly, in accordance with an embodiment of the invention.

FIG. 14 shows an assembled joint in accordance with the present invention. As shown, joint assembly 19 includes six tubular members with end caps 5 assembled on a circular ring 3. The pins are not visible since the end caps are covering them. The tubular members 1 are assembled the same way at each respective end and are free to rotate about the plane of ring 3 over almost 360 degrees. The joints may be assembled, reconfigured, or disassembled rapidly. The ring may be fabricated, for example, from steel or stainless steel and tubes 1 may be fabricated, for example, from PVC, steel, or stainless steel. The joint assembly 19 may be repeated numerous times in order to assemble complex space frame structures, as described later.

Figure 15:
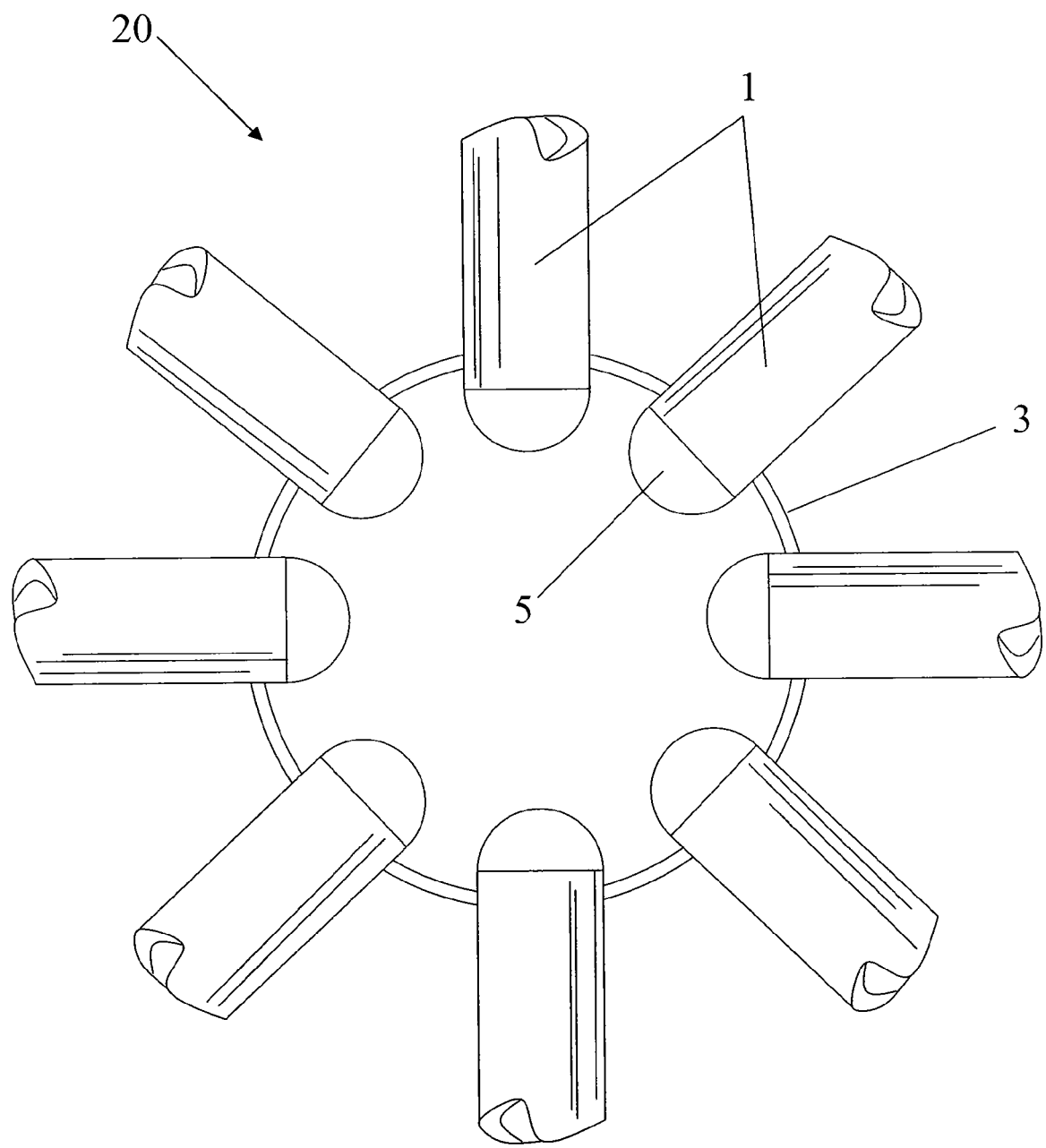
FIG. 15 is a top view of an eight-tube ring assembly, in accordance with an embodiment of the invention.

FIG. 15 is another assembled joint in accordance with the present invention. The joint assembly 20 includes eight tubular members assembled on circular ring 3 and includes end caps 5. The tubular members 1 may be assembled in the same manner at each respective end, and are free to rotate about the plane of ring 3 over almost 360 degrees.

Figure 16:
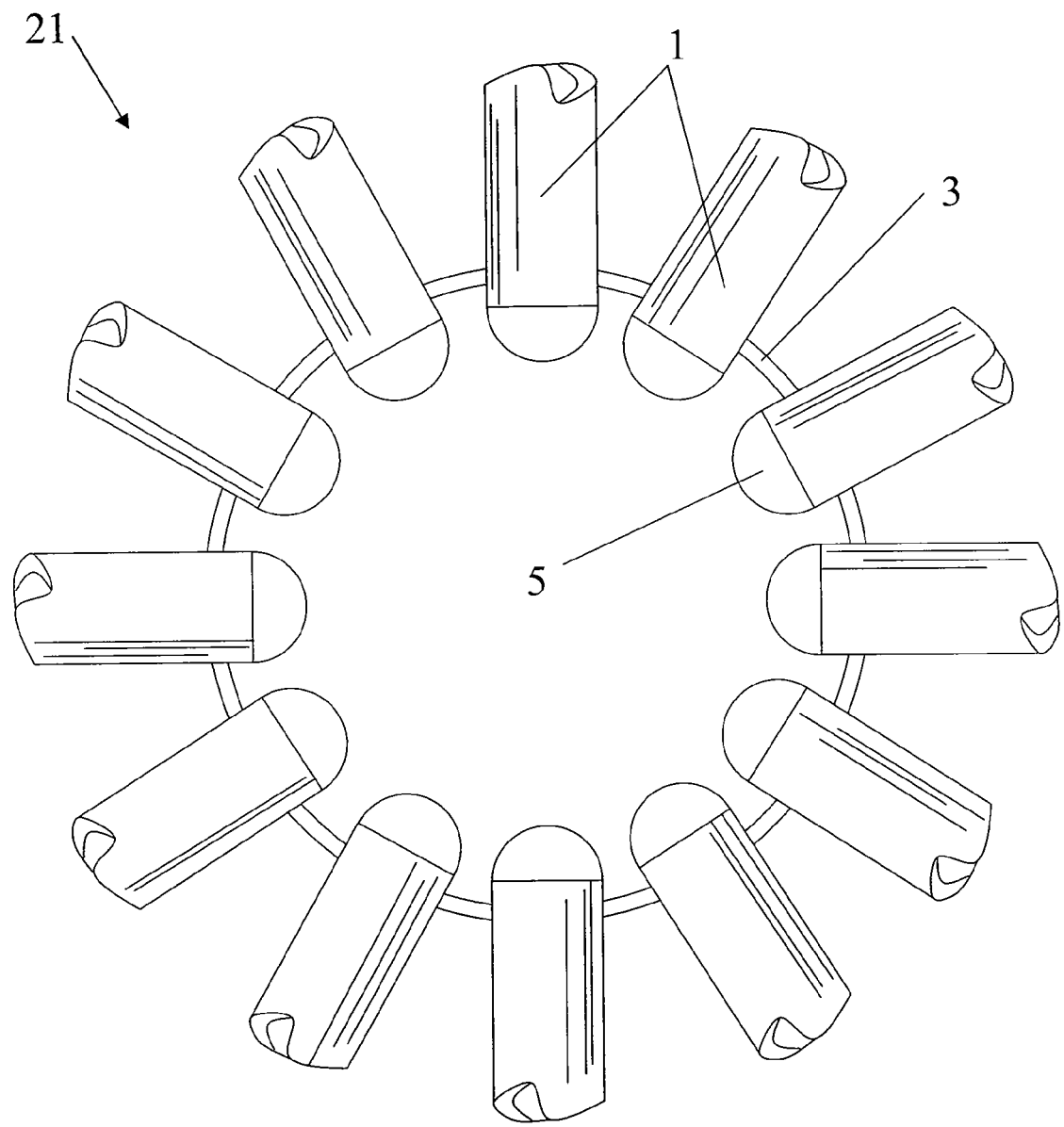
FIG. 16 is a top view of a twelve-tube ring assembly, in accordance with an embodiment of the invention.

FIG. 16 shows yet another assembled joint, designated as 21, in accordance with the present invention. As shown, the joint assembly includes twelve tubular members assembled on a circular ring 3 and includes end caps 5. Each joint 21 may be assembled, reconfigured, or disassembled rapidly using the present invention.

Figure 17:
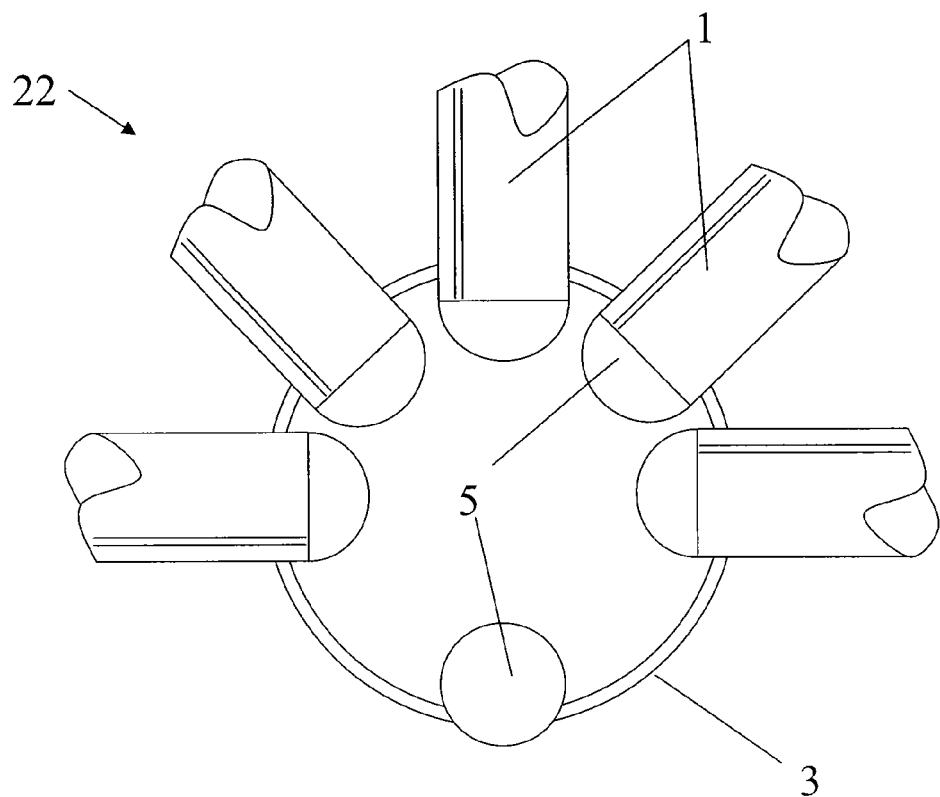
FIG. 17 is a top view of a six-tube ring assembly with one tube shown oriented perpendicularly to the other tubes, in accordance with an embodiment of the invention.

FIG. 17 shows an assembled joint 22 in accordance with the present invention. The assembled joint 22 shows the versatility of the present invention. As shown, 5 tubular members 1 are oriented in the plane of circular ring 3 and one tubular member 1 is oriented perpendicularly to the plane of circular ring 3. The joint assembly 22 may be used, for example, in trusses, where the plane of ring 3 may be oriented perpendicularly rather than horizontally to the ground.

Figure 18:
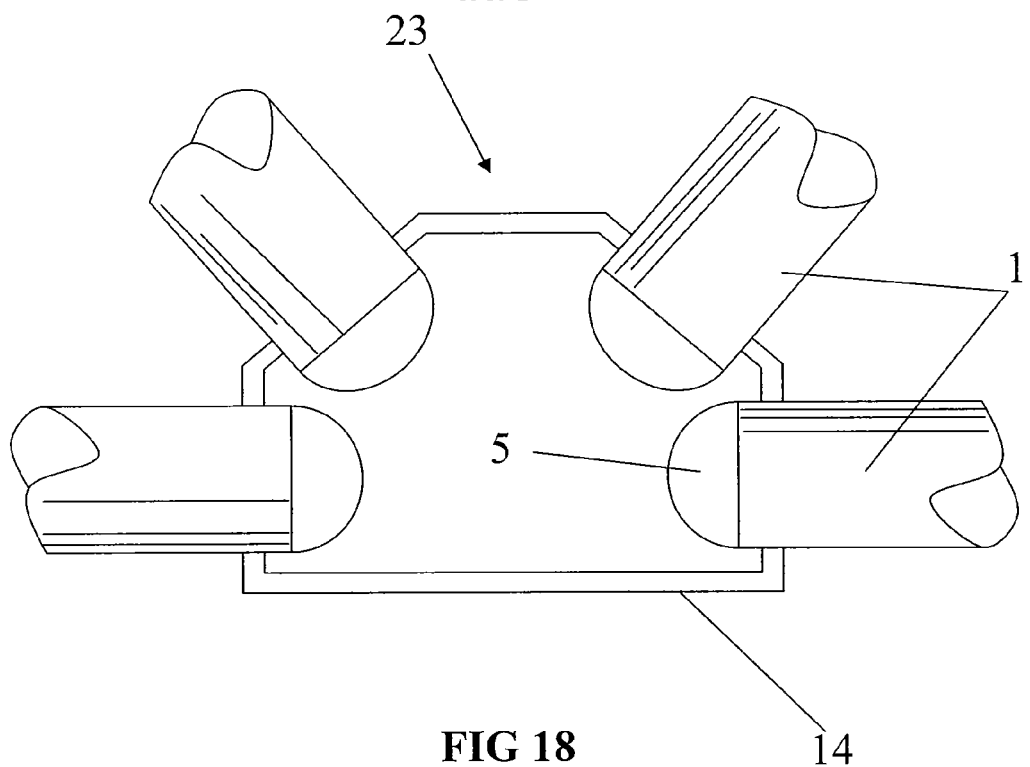
FIG. 18 is a top view of a four tube truncated ring assembly, in accordance with an embodiment of the invention.

FIG. 18 shows another assembled joint in accordance with the present invention. Tubular members 1 may be added or removed easily from the polygonal ring 14 in any complex space frame structure. The assembled joint 23 in FIG. 18 may be ideal, as an example, for the bottom edge of a geodesic dome, where vertical rings may come in contact with the ground.

Figure 19:
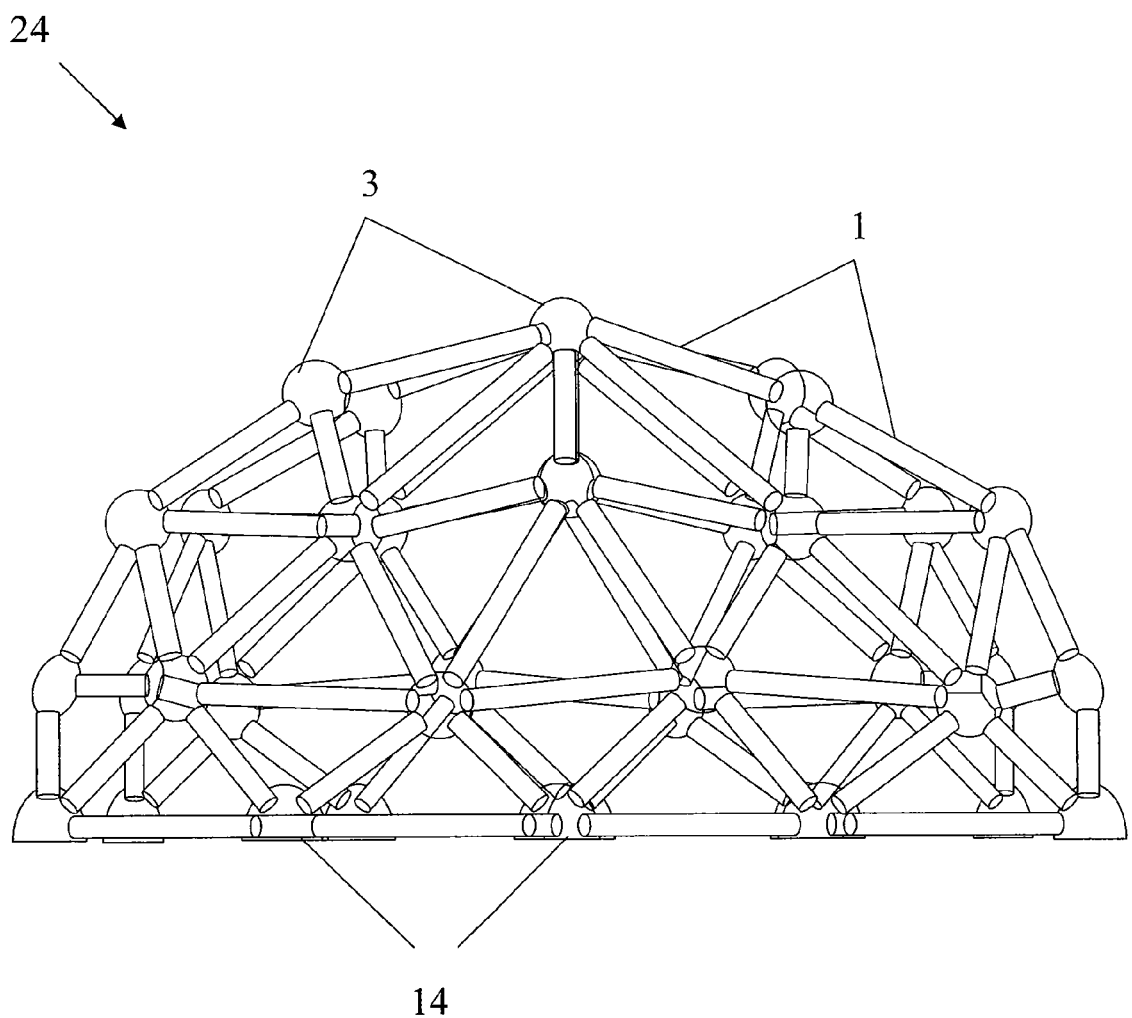
FIG. 19 is an assembled geodesic dome that uses hub joints of the present invention.

FIG. 19 shows an exemplary assembled space frame structure that uses an embodiment of the present invention. As shown, space frame structure 24 is a geodesic dome, and uses hub joints including multiple tubular members 1 and multiple rings 3 and multiple rings 14. The bottom row of the frame structure showing rings 14 includes the polygonal rings 14 shown in FIG. 10, which may be oriented vertically with respect to the ground or a surface upon which the frame structure may be assembled. All the other rings, designated as 3, may be, for example, any other ring assembly in accordance with the aforementioned embodiments, previously described. The structure 24 in FIG. 19 is strong, lightweight, low cost, and may be scaled to almost any desired size. Furthermore, frame structure 24 may be reconfigured into many different space frame designs using similar components. For the sake of clarity, the pins and the end caps have been omitted from FIG. 19 (and the other later described figures).

Figure 20:
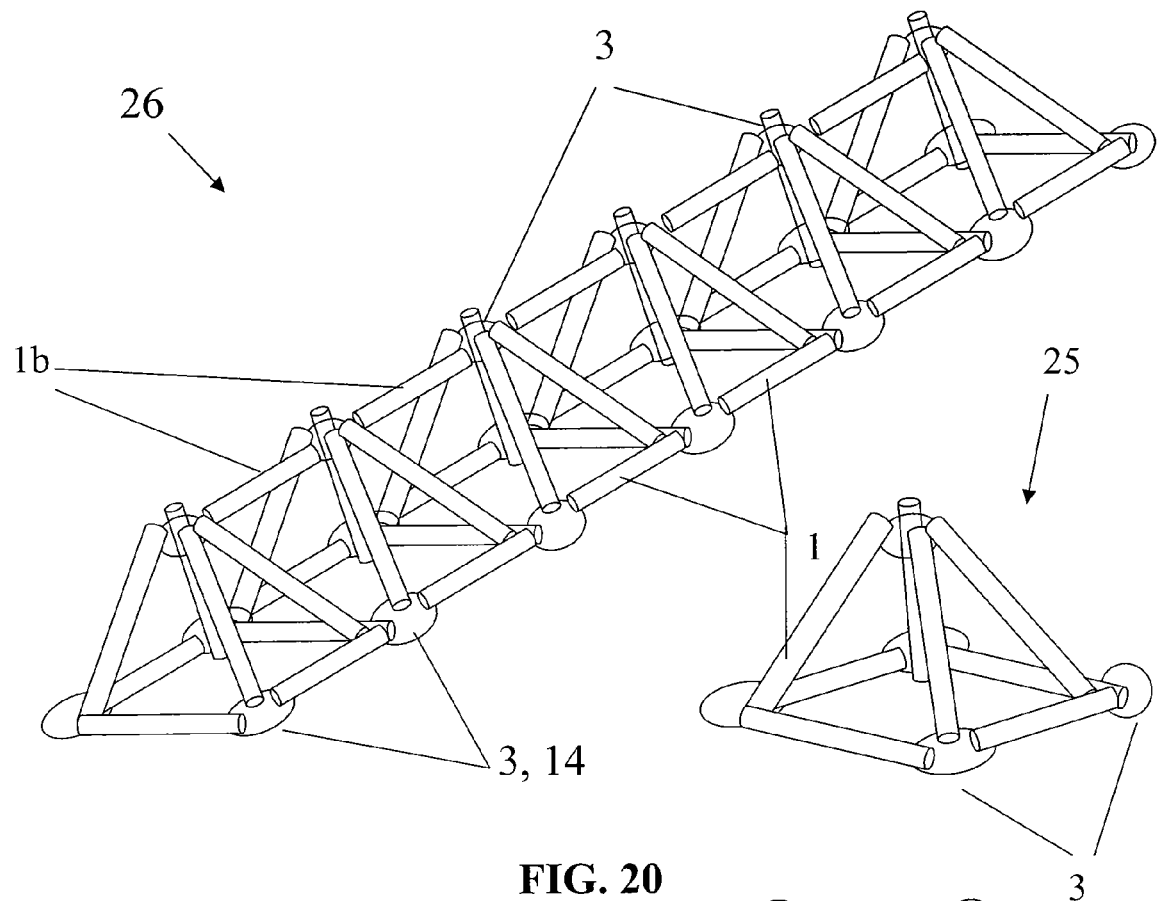
FIG. 20 is an assembled truss composed of pentahedron units that uses hub joints of the present invention.

FIG. 20 shows an assembled truss, designated as 26, that uses embodiments of the present invention. The assembled truss structure 26 may be assembled using multiple tetrahedron units 25. The hub joints include rings 3 and/or 14 that are used for joining multiple tubular members 1. As shown, the top tubular members 1b connect the tetrahedron units at strategic locations and provide strength. These tubular members 1b also allow a long truss to be rapidly assembled, reconfigured, or disassembled. This truss structure 26 may be employed for different applications by positioning the truss structure in any attitude, including a horizontal or a vertical attitude with respect to a ground plane. Long trusses may be used as load bearing structures spanning long distances. The truss structure may also be positioned perpendicular to the ground and may be used as an antenna support frame, or as one of many vertical column structures for a single level or multi-level building structure. In addition, this so called modified Warren truss shown in FIG. 20 may be seamlessly expanded into similar or different space frame structures in any dimension.

Figure 21:
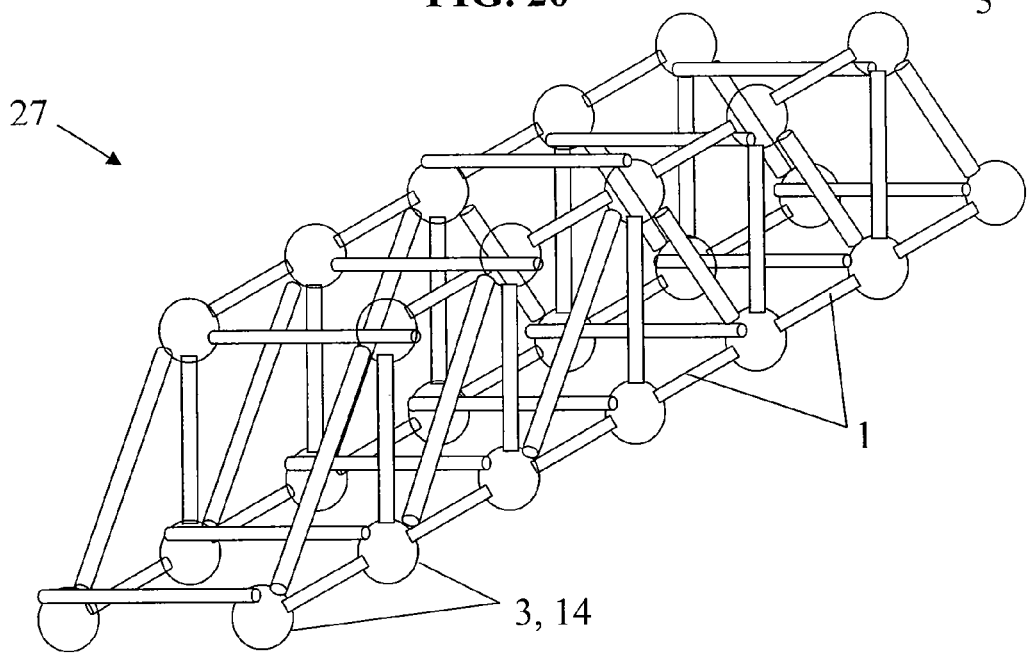
FIG. 21 is an assembled Howe truss that uses hub joints of the present invention.

FIG. 21 shows an assembled Howe truss structure that uses embodiments of the present invention. The Howe truss is strong enough to be used in steel bridges. Its impressive strength over long spans also contributed to its overwhelming popularity as a railroad bridge. The structure 27 may be assembled using rings 3 and/or 14 placed vertically at joint locations receiving the multiple tubular members 1. The rings in FIG. 21 may also be positioned perpendicular to the ground plane of the structure, rather than parallel to the ground plane. (Rings positioned parallel to the ground plane may violate the position requirements of the tubular members required to assemble a Howe truss.) The truss frame 27 may easily be reconfigured into a Pratt truss, a modified Warren truss, or other popular trusses that exhibit strength with minimal number of members used to span long distances.

Figure 22:
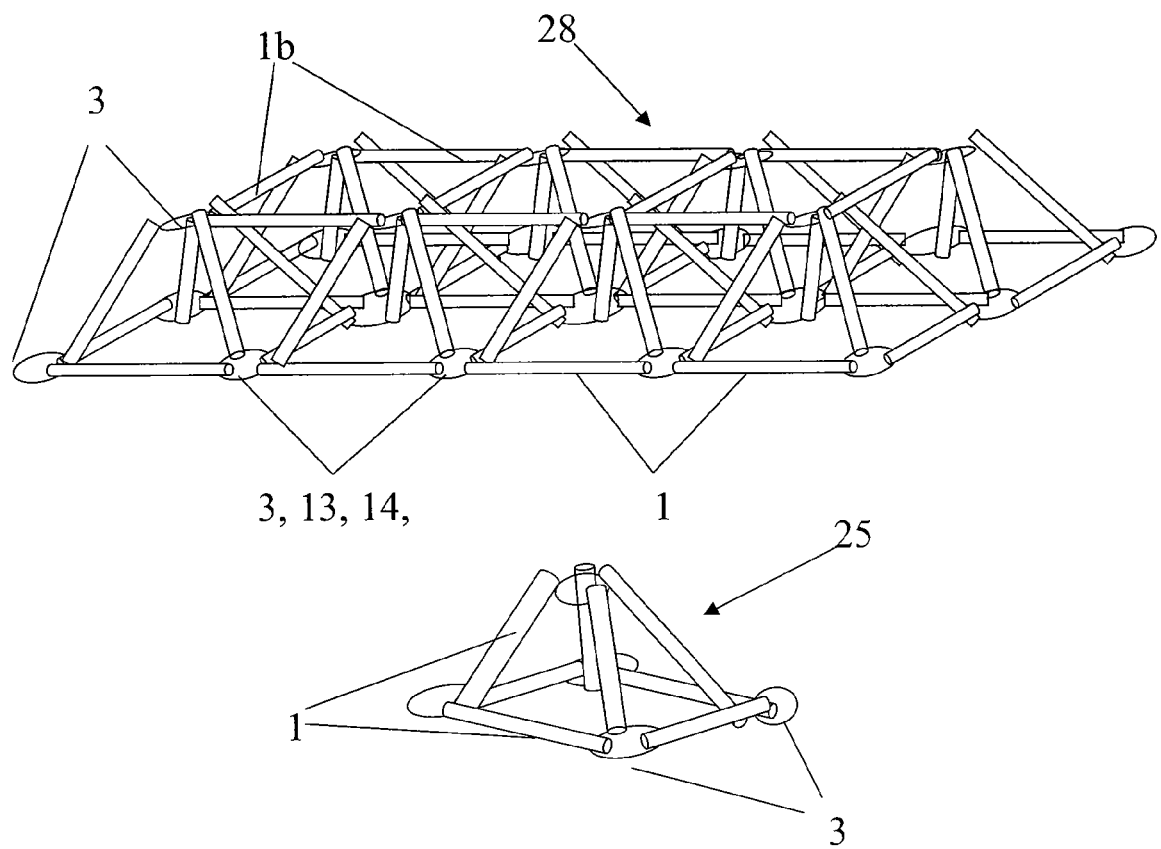
FIG. 22 is an assembled space frame that uses hub joints of the present invention.

FIG. 22 shows an assembled space frame structure in accordance with another embodiment of the present invention. The assembled structure 28 may be assembled from multiple pentahedron units, designated as 25. The pentahedron unit 25 may be assembled in any direction with tubular members 1b added to provide a strong, rigid, and expandable space frame structure. The length of the tubular members 1 and 1b may be scaled without degradation or loss of integrity of the overall structure. Hence, the overall size of the space frame structure 28 may be sufficient to cover a large area and may be easily and rapidly assembled, reconfigured, or disassembled, without any special tools.

Figure 23:
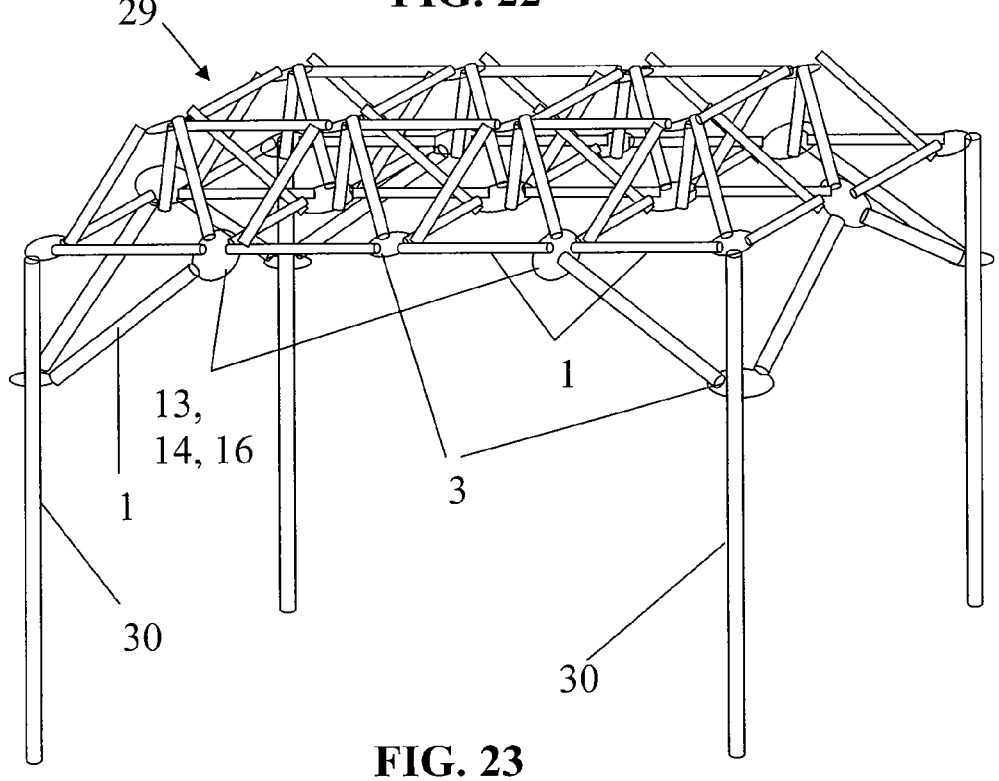
FIG. 23 is an assembled space frame with vertical supports that uses hub joints of the present invention.

FIG. 23 shows an assembled space frame structure that uses an embodiment of the present invention. The assembled structure 29 includes support legs 30 comprised of tubular members that are joined at multiple ring hubs. The ring hubs may include any configuration shown in the aforementioned hub assembly figures, such as rings 3, 13, 14 and/or 16.

Figure 24:
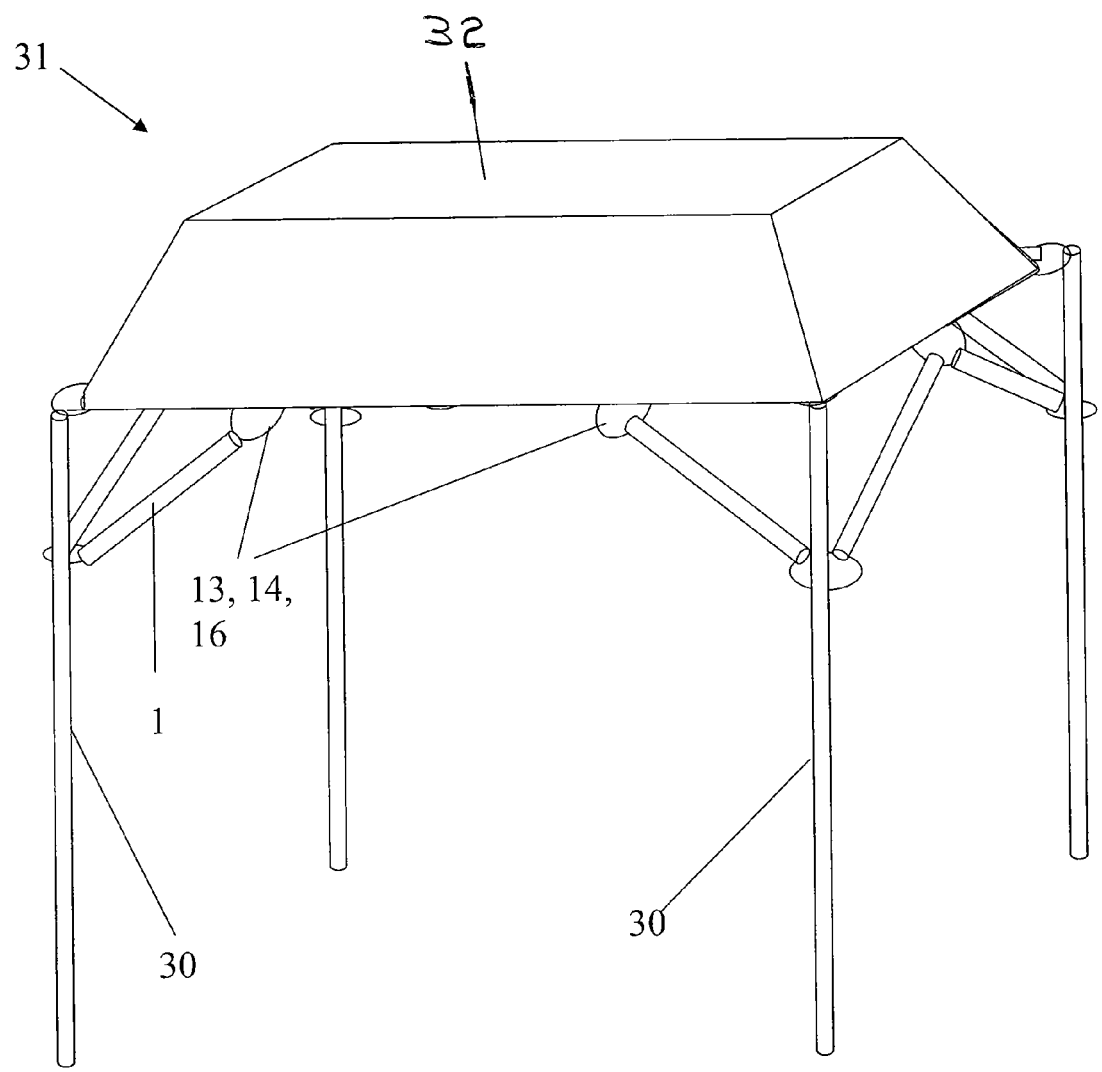
FIG. 24 is the assembled space frame of FIG. 23 including a canopy.
Figure 25:
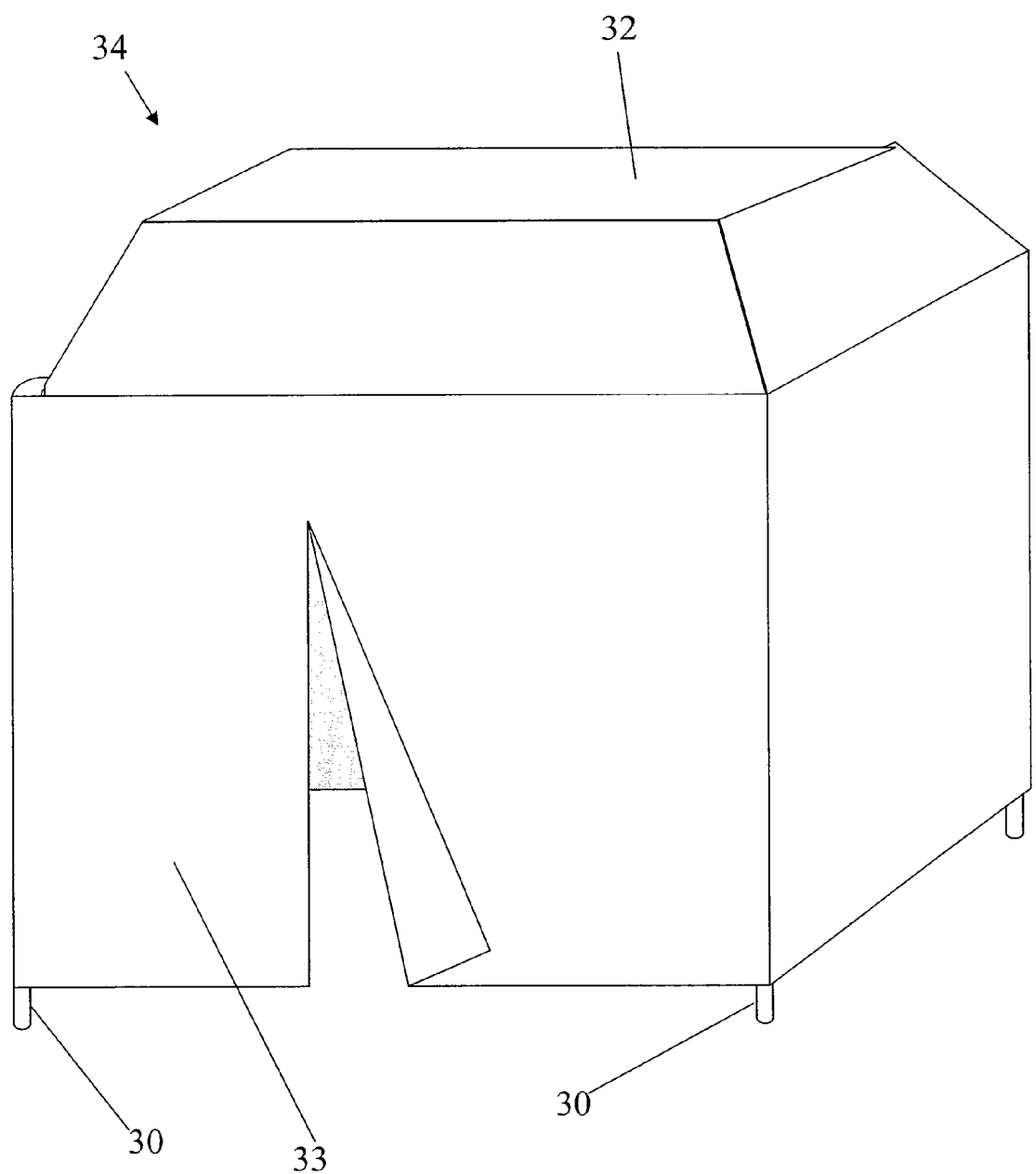
FIG. 25 is the assembled space frame of FIG. 23 including a canopy and skirt.

FIG. 24 shows an assembled space frame structure 31 that includes vertical support members 30 and a canopy, the latter designated as 32. FIG. 25 shows another assembled space frame structure 34 that includes vertical support members 30, canopy 32, and a skirt 33

Figure 26:
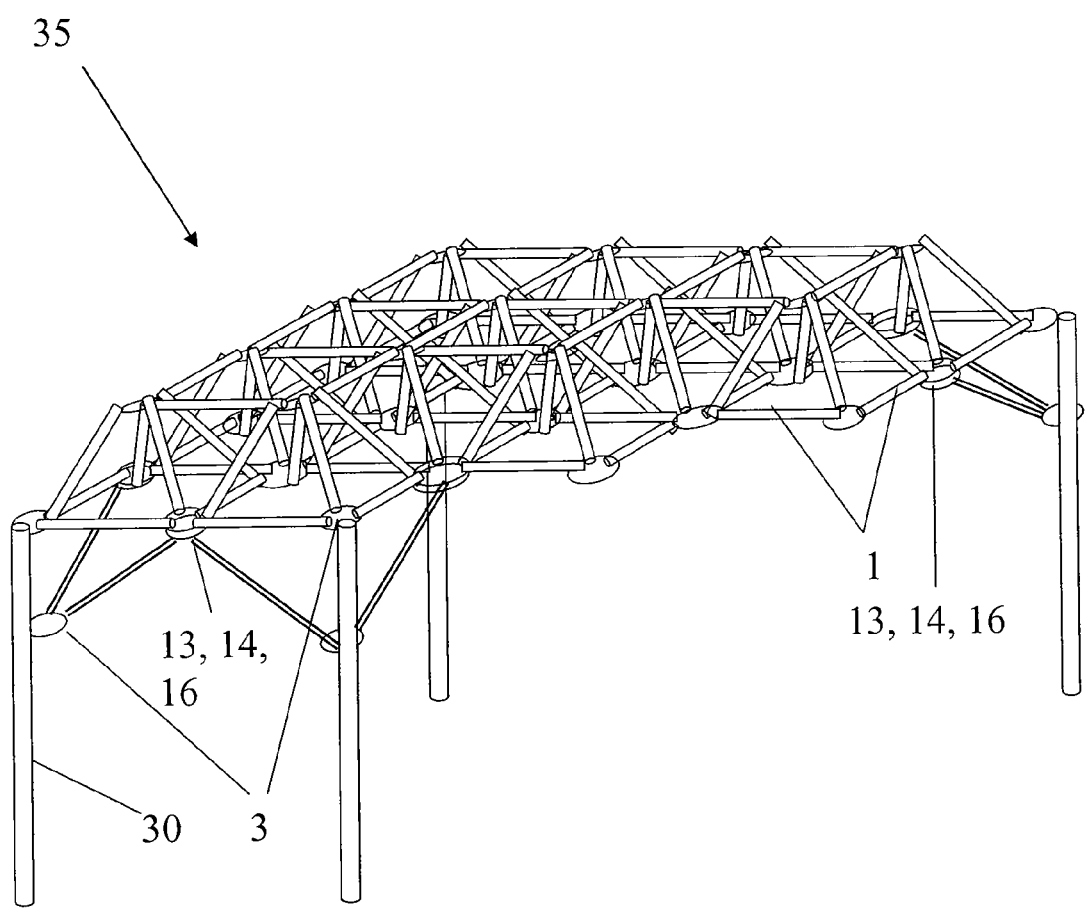
FIG. 26 is a custom fit space frame with vertical supports that uses hub joints of the present invention.

FIG. 26 shows an assembled custom space frame structure using an embodiment of the present invention. The assembled structure 35 may be assembled from pentahedron units 25, and may be connected at the top layer with horizontal tubular members 1b. This structure provides a high degree of strength and stability, while using low cost lightweight materials. The joints may be assembled using rings 3, 13, 14, and/or 16, as needed to form a repeatable and lightweight structure. These custom structures may be rapidly assembled to fit into any area and around any type of obstacles. Furthermore, these custom structures may be assembled over large areas with vertical members placed strategically for maximum strength and stability.

Figure 27:
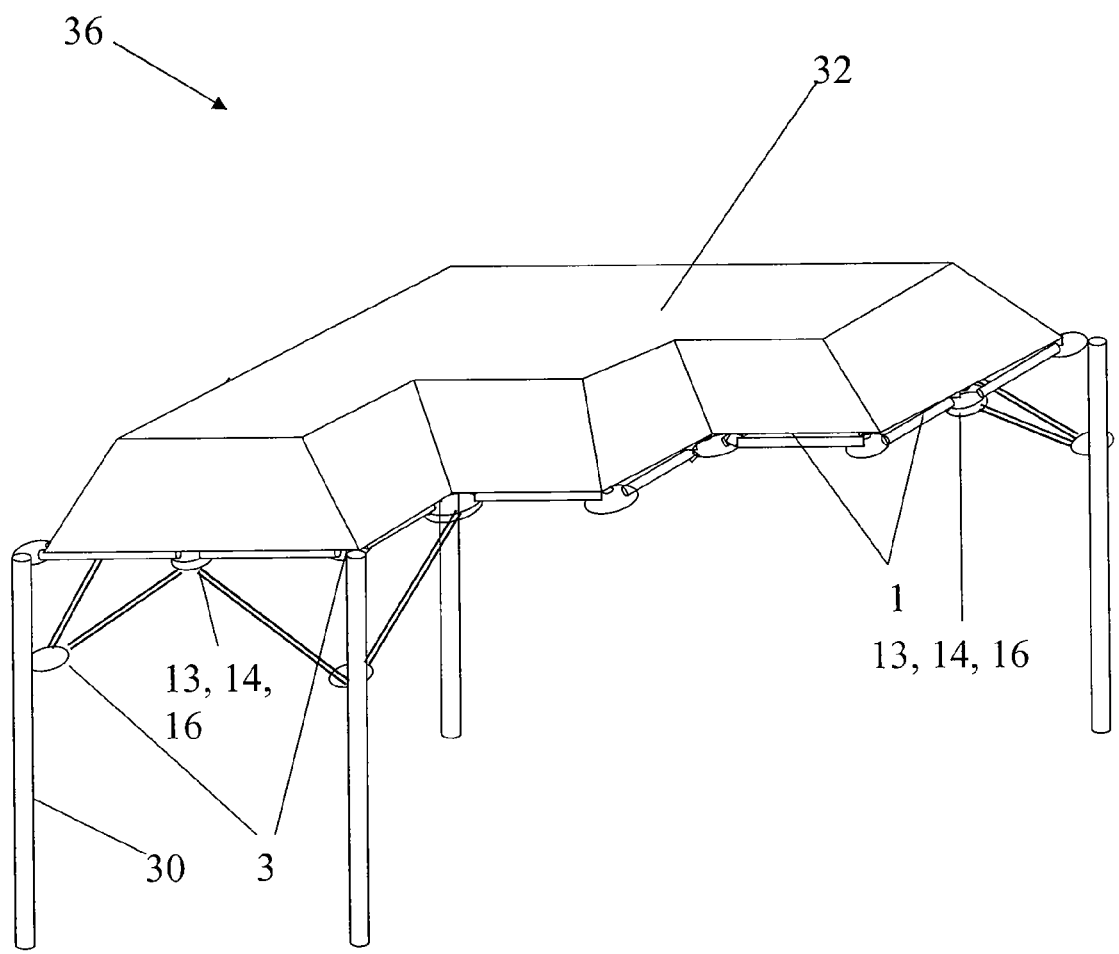
FIG. 27 is the custom fit space frame of FIG. 26 with vertical supports and a canopy.
Figure 28:
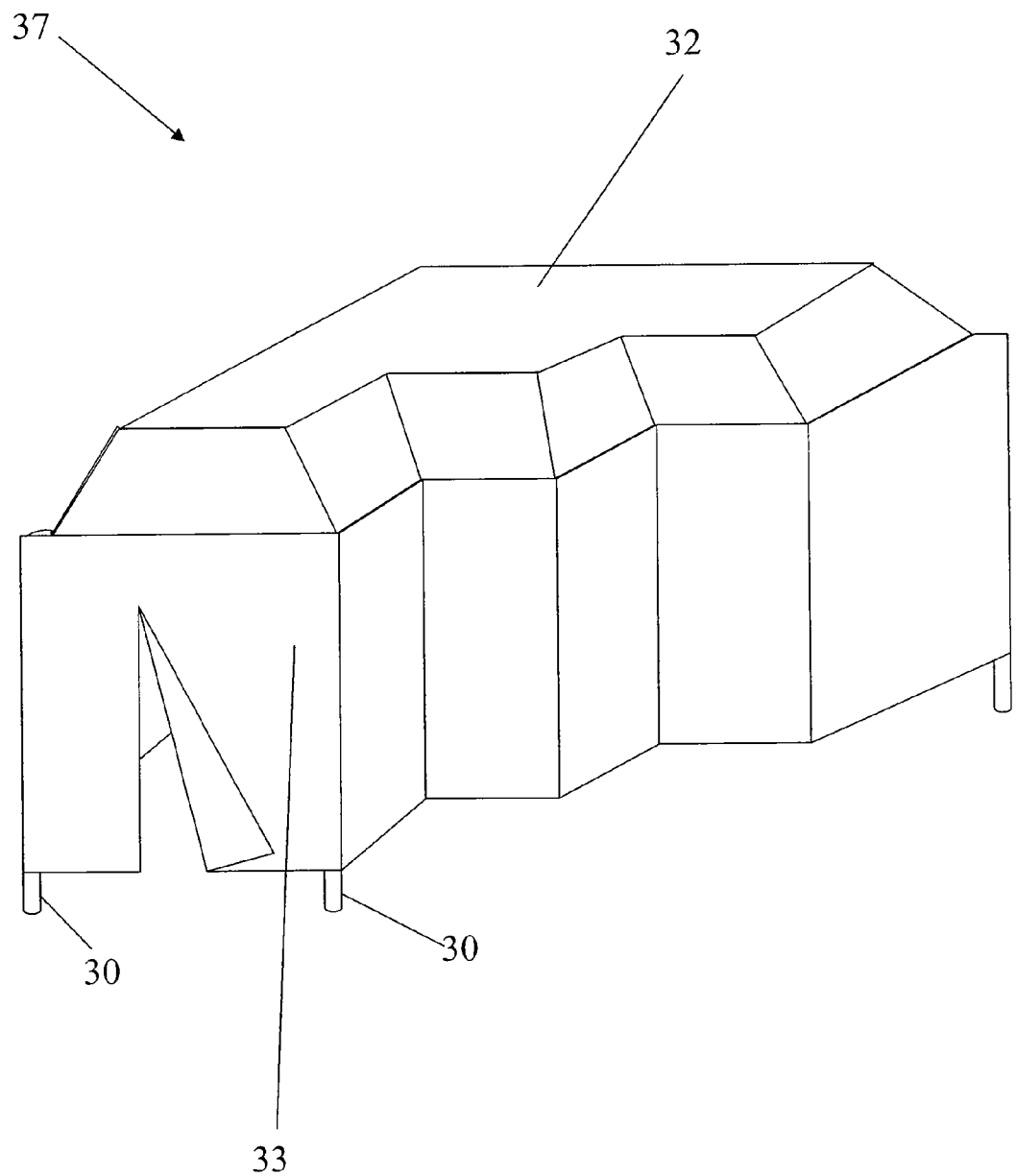
FIG. 28 is the custom fit space frame of FIG. 26 with vertical supports, canopy and skirt.

FIG. 27 shows yet another assembled custom space frame structure in accordance with the present invention. The assembled structure 36 includes a plurality of vertical support members 30 that are connected as previously described. Hub joints that include rings 3, 13, 14 and/or 16 may also be used. A canopy 32 may also be included to map onto any layout of the assembled space frame. FIG. 28 shows the same assembled custom space frame structure and includes a skirt 33. This configuration may be ideal for strong durable tents or shelters.

Figure 29:
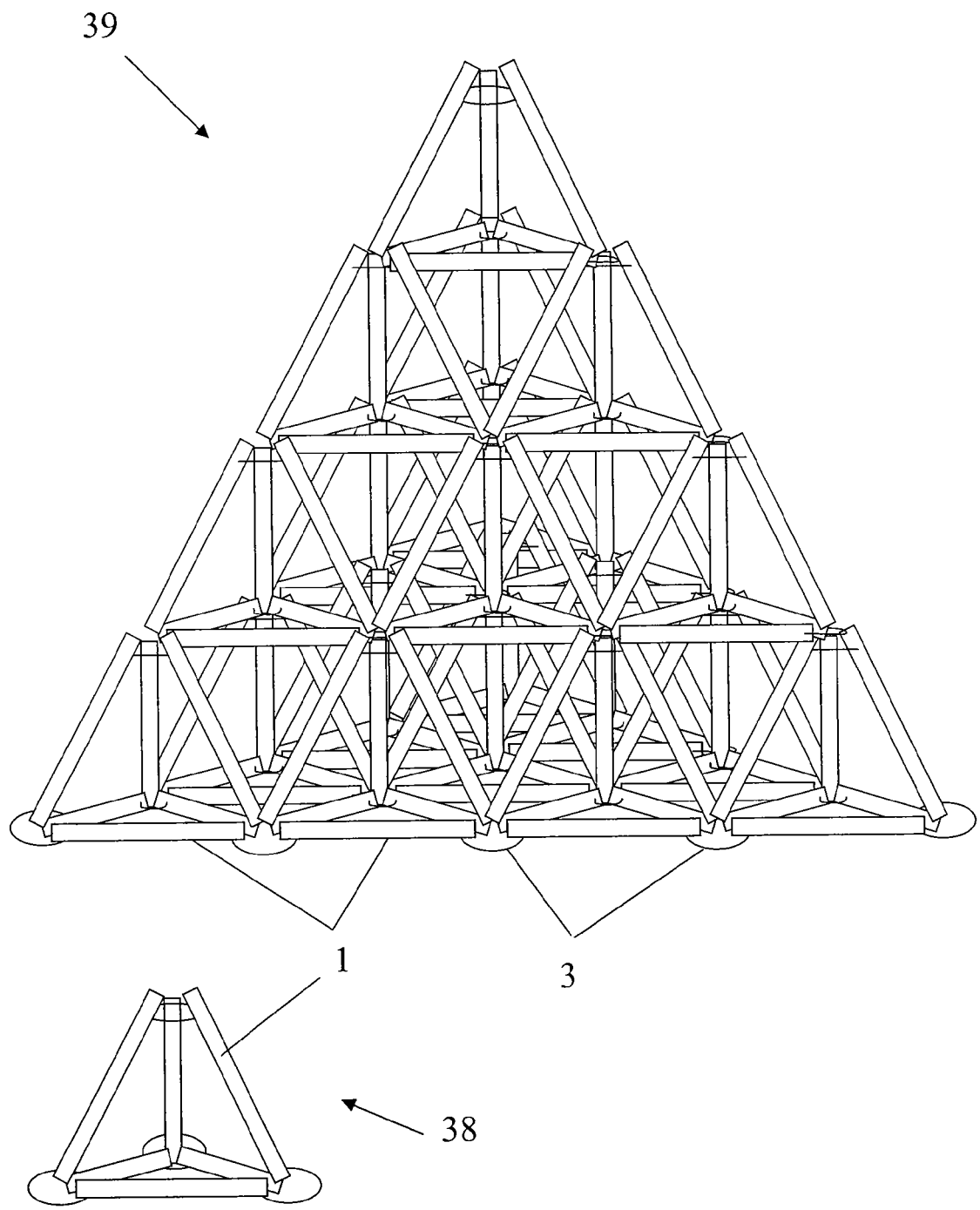
FIG. 29 is an assembled four-story space frame structure composed of tetrahedron units, in accordance with an embodiment of the invention.

FIG. 29 shows still another assembled space frame structure, which uses the present invention. The structure 39 may be assembled from multiple tetrahedron units 38, by connecting these units horizontally and vertically with the many rings of the present invention. Large three dimensional space frame structures may be easily and rapidly assembled using low cost common off-the-shelf tubular members 1 and rings 3, for example. In addition, unique custom structures may be assembled or added, such as trusses, towers, and larger tetrahedrons to create a "city" of unique custom space frame structures.

Figure 30:
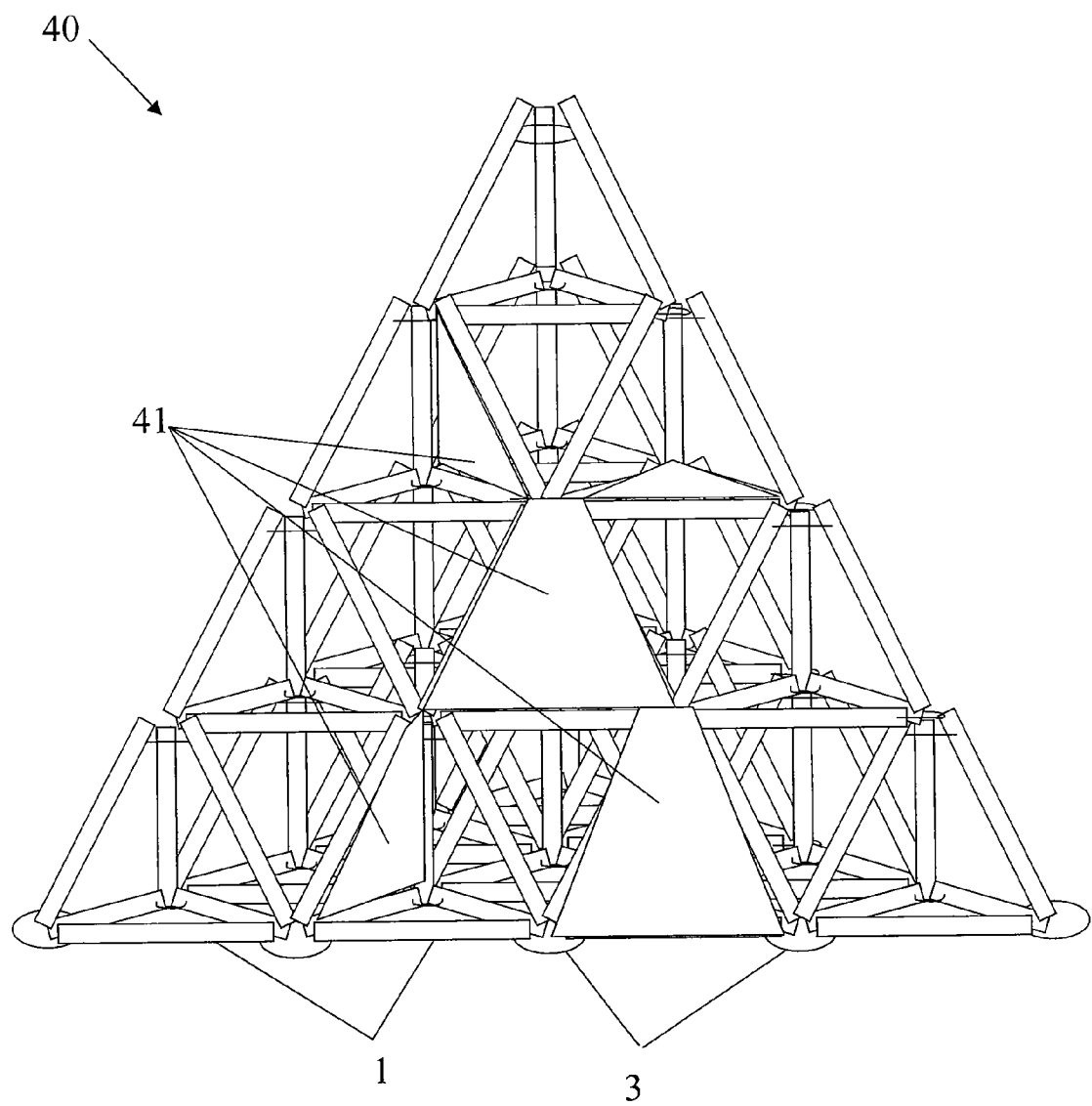
FIG. 30 is the assembled four-story space frame structure if FIG. 29 with accessory panels.

FIG. 30 shows the same assembled space frame structure with the addition of accessories. The shown accessories are custom fitted panels 41 that may be assembled to create three dimensional mazes and may be partitioned into areas for games or for therapeutic applications.

While the invention has been described with respect to particular embodiments shown and discussed above, numerous alternatives, modifications and variations will occur to those who read and understand this specification. It is intended that all such alternatives, modifications and variations be included within the spirit and scope of the following claims:

What is claimed is:
1. A frame system consisting of:
longitudinal members, rods and locking pins;
wherein each longitudinal member is defined by a circumferential wall forming a longitudinal core and at least one transverse slot completely spaced from an end of the longitudinal member and formed through the circumferential wall for communicating with the longitudinal core,
each rod is inserted into a transverse slot of a respective longitudinal member, and
each locking pin is inserted within a longitudinal core of a respective longitudinal member for clasping a rod.

2. The frame system of claim 1 wherein
joints are formed in the frame system, and
each joint consists of a longitudinal member and a rod clasped by a locking pin.

3. The frame system of claim 1 wherein:
at least one of the rods is curved so that ends of the rod are in contact to form a ring.

4. The frame system of claim 1 wherein:
each locking pin is defined by two arms biased by a spring, and the two arms are configured to clasp a rod.

5. The frame system of claim 1 wherein:
a longitudinal member is rotatable about a rod.

6. The frame system of claim 1 wherein:
each rod is inserted substantially parallel to a transverse slot of a longitudinal member,
each locking pin is inserted substantially parallel to a longitudinal axis of a longitudinal core, and
each rod forms a hinge, about which a longitudinal member is rotatable.

7. The frame system of claim 1 wherein:
a transverse slot is formed at a first longitudinal end of each longitudinal member; a
rod is transversely inserted into the transverse slot at the first longitudinal end of each longitudinal member; at
least one longitudinal member includes an additional transverse slot formed at a second longitudinal end of the one longitudinal member; and
an additional rod and an additional locking pin are configured for insertion into the second longitudinal end of the one longitudinal member and the additional transverse slot, respectively.

8. The frame system of claim 1 wherein a longitudinal member includes:
a cap for sealing an end of the longitudinal core of the respective longitudinal member, after a locking pin is inserted to clasp a rod.

9. The frame system of claim 1 wherein:
a rod is shaped to form a polygon with the ends of the rod abutted to each other.

10. A frame system consisting of two or more sets, each set including a member, a rod, and a locking pin,
wherein a member is defined by a circumferential wall forming a longitudinal core and at least one transverse slot completely spaced from an end of the longitudinal member and formed through the circumferential wall for communicating with the longitudinal core,
a rod is defined by a curved or linear bar configured for insertion into a transverse slot of a member, and
a locking pin is defined by a clasp configured for insertion into a longitudinal core of a member to clasp a rod disposed in a transverse slot.

11. The frame system of claim 10 wherein
a member, a rod and a locking pin forms a joint in the frame system.

12. The frame system of claim 10 wherein
a rod is curved so that ends of the rod are in contact to form a ring.

13. The frame system of claim 10 wherein
a locking pin includes two arms biased by a spring, and the two arms are configured to clasp a rod.

14. The frame system of claim 10 wherein
the members are rotatable about one or more of the rods.

15. The frame system of claim 10 wherein
a rod is inserted substantially parallel to a transverse slot of a member,
a locking pin is inserted substantially parallel to a longitudinal axis of a longitudinal core of each member, and
each member is rotatable about a rod.

16. The frame system of claim 10 wherein
a transverse slot is formed at a first longitudinal end of each member; a
rod is transversely inserted into the transverse slot at the first longitudinal end of each member; at
least one member includes an additional transverse slot formed at a second longitudinal end of the one member; and
an additional rod and an additional locking pin are configured for insertion into the second longitudinal end of the one member and the additional transverse slot, respectively.

17. The frame system of claim 10 wherein
the members are formed from either hollow polyvinyl chloride (PVC) tubing, hollow steel tubing, or hollow aluminum tubing.

* * * * *